US011949188B2

(12) United States Patent
Jepsen et al.

(10) Patent No.: US 11,949,188 B2
(45) Date of Patent: *Apr. 2, 2024

(54) METHODS FOR CONCURRENTLY FORMING MULTIPLE ELECTRICAL CONNECTIONS IN A NEURO-MONITORING SYSTEM

(71) Applicant: Cadwell Laboratories, Inc., Kennewick, WA (US)

(72) Inventors: David Lee Jepsen, Kennewick, WA (US); Richard A. Villarreal, West Richland, WA (US)

(73) Assignee: Cadwell Laboratories, Inc., Kennewick, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,043

(22) Filed: Oct. 15, 2021

(65) Prior Publication Data

US 2022/0109269 A1 Apr. 7, 2022

Related U.S. Application Data

(63) Continuation of application No. 16/532,739, filed on Aug. 6, 2019, now Pat. No. 11,177,610, which is a (Continued)

(51) Int. Cl.
*H01R 13/62* (2006.01)
*H01R 13/46* (2006.01)

(Continued)

(52) U.S. Cl.
CPC ........... *H01R 13/62* (2013.01); *H01R 13/518* (2013.01); *H01R 25/16* (2013.01); *H01R 13/465* (2013.01); *H01R 43/26* (2013.01); *H01R 2201/12* (2013.01)

(58) Field of Classification Search
CPC .... H01R 4/2429; H01R 4/2433; H01R 4/245; H01R 13/62; H01R 13/518; H01R 13/465; H01R 25/16; H01R 43/26; H01R 2201/12

(Continued)

(56) References Cited

U.S. PATENT DOCUMENTS 751,475 A 2/1904 Vilbiss
972,983 A 10/1910 Arthur (Continued)

FOREIGN PATENT DOCUMENTS

AT 466451 T 5/2010
AT 539680 T 1/2012

(Continued)

OTHER PUBLICATIONS

Calancie, et. al., "Threshold-level repetitive transcranial electrical stimulation for intraoperative monitoring of central motor conduction", J. Neurosurg 95:161-168 (2001).

(Continued)

*Primary Examiner* — Gary F Paumen
(74) *Attorney, Agent, or Firm* — Novel IP

(57) ABSTRACT

Systems, devices and methods are described for connecting multiple electrical connectors as a group with corresponding receiving sockets, or connection ports, in a medical device. A multiple electrical connector plate acts as an intermediate connector for quickly engaging or disengaging a group of electrodes with the corresponding device as a single unit. The connection plate includes multiple sections that allow a connector to be snapped securely in place on the connection plate such that the connector does not pull or push free from its snapped in location, resulting in group handling of electrical connectors that is less time consuming, reduces errors and positively impacts the quality of medical care.

20 Claims, 23 Drawing Sheets

Related U.S. Application Data continuation of application No. 15/900,718, filed on Feb. 20, 2018, now Pat. No. 10,418,750, which is a continuation of application No. 15/413,051, filed on Jan. 23, 2017, now Pat. No. 9,935,395.

(51) Int. Cl.
*H01R 13/518* (2006.01)
*H01R 25/16* (2006.01)
*H01R 43/26* (2006.01)

(58) Field of Classification Search
USPC .................................................. 439/403, 402
See application file for complete search history.

(56) References Cited

U.S. PATENT DOCUMENTS 1,328,624 A 1/1920 Graham
1,477,527 A 12/1923 Raettig
1,548,184 A 8/1925 Cameron
1,717,480 A 6/1929 Wappler
1,842,323 A 1/1932 Lorand
2,110,735 A 3/1938 Marton
2,320,709 A 6/1943 Arnesen
2,516,882 A 8/1950 Kalom
2,704,064 A 3/1955 Fizzell
2,736,002 A 2/1956 Oriel
2,807,259 A 9/1957 Federico
2,808,826 A 10/1957 Reiner
2,994,324 A 8/1961 Lemos
3,035,580 A 5/1962 Guiorguiev
3,057,356 A 10/1962 Greatbatch
3,060,923 A 10/1962 Reiner
3,087,486 A 4/1963 Kilpatrick
3,147,750 A 9/1964 Fry
3,188,605 A 6/1965 Slenker
3,212,496 A 10/1965 Preston
3,219,029 A 11/1965 Richards
3,313,293 A 4/1967 Chesebrough
3,364,929 A 1/1968 Ide
3,580,242 A 5/1971 La Croix
3,611,262 A 10/1971 Marley
3,617,616 A 11/1971 O'Loughlin
3,641,993 A 2/1972 Gaarder
3,646,500 A 2/1972 Wessely
3,651,812 A 3/1972 Samuels
3,662,744 A 5/1972 Richardson
3,664,329 A 5/1972 Naylor
3,682,162 A 8/1972 Colyer
3,703,900 A 11/1972 Holznagel
3,718,132 A 2/1973 Holt
3,733,574 A 5/1973 Scoville
3,785,368 A 1/1974 McCarthy
3,830,226 A 8/1974 Staub
3,857,398 A 12/1974 Rubin
3,880,144 A 4/1975 Coursin
3,933,157 A 1/1976 Bjurwill
3,957,036 A 5/1976 Normann
3,960,141 A 6/1976 Bolduc
3,985,125 A 10/1976 Rose
4,062,365 A 12/1977 Kameny
4,088,141 A 5/1978 Niemi
4,099,519 A 7/1978 Warren
4,127,312 A 11/1978 Fleischhacker
4,141,365 A 2/1979 Fischell
4,155,353 A 5/1979 Rea
4,164,214 A 8/1979 Pelzner
4,175,551 A 11/1979 Irnee
4,177,799 A 12/1979 Masreliez
4,184,492 A 1/1980 Fastenmeier
4,200,104 A 4/1980 Harris
4,204,545 A 5/1980 Yamakoshi
4,207,897 A 6/1980 Evatt
4,224,949 A 9/1980 Scott
4,226,228 A 10/1980 Shin
4,232,680 A 11/1980 Hudleson
4,233,987 A 11/1980 Feingold
4,235,242 A 11/1980 Heule
4,263,899 A 4/1981 Burgin
4,265,237 A 5/1981 Schwanbom
4,285,347 A 8/1981 Hess
4,291,705 A 9/1981 Severinghaus
4,294,245 A 10/1981 Bussey
4,295,703 A 10/1981 Osborne
4,299,230 A 11/1981 Kubota
4,308,012 A 12/1981 Tamler
4,331,157 A 5/1982 Keller, Jr.
4,372,319 A 2/1983 Ichinomiya
4,373,531 A 2/1983 Wittkampf
4,374,517 A 2/1983 Hagiwara
4,402,323 A 9/1983 White
4,444,187 A 4/1984 Perlin
4,461,300 A 7/1984 Christensen
4,469,098 A 9/1984 Davi
4,483,338 A 11/1984 Bloom
4,485,823 A 12/1984 Yamaguchi
4,487,489 A 12/1984 Takamatsu
4,503,842 A 3/1985 Takayama
4,503,863 A 3/1985 Katims
4,510,939 A 4/1985 Brenman
4,515,168 A 5/1985 Chester
4,517,976 A 5/1985 Murakoshi
4,517,983 A 5/1985 Toyosu
4,519,403 A 5/1985 Dickhudt
4,537,198 A 8/1985 Corbett
4,545,374 A 10/1985 Jacobson
4,557,273 A 12/1985 Stoller
4,558,703 A 12/1985 Mark
4,561,445 A 12/1985 Berke
4,562,832 A 1/1986 Wilder
4,565,200 A 1/1986 Cosman
4,570,640 A 2/1986 Barsa
4,573,448 A 3/1986 Kambin
4,573,449 A 3/1986 Warnke
4,576,178 A 3/1986 Johnson
4,582,063 A 4/1986 Mickiewicz
4,592,369 A 6/1986 Davis
4,595,018 A 6/1986 Rantala
4,616,635 A 10/1986 Caspar
4,616,660 A 10/1986 Johns
4,622,973 A 11/1986 Agarwala
4,633,889 A 1/1987 Talalla
4,641,661 A 2/1987 Kalarickal
4,643,507 A 2/1987 Coldren
4,658,835 A 4/1987 Pohndorf
4,667,676 A 5/1987 Guinta
4,697,598 A 10/1987 Bernard
4,697,599 A 10/1987 Woodley
4,705,049 A 11/1987 John
4,716,901 A 1/1988 Jackson
4,739,772 A 4/1988 Hokanson
4,744,371 A 5/1988 Harris
4,759,377 A 7/1988 Dykstra
4,763,666 A 8/1988 Strian
4,765,311 A 8/1988 Kulik
4,784,150 A 11/1988 Voorhies
4,785,812 A 11/1988 Pihl
4,795,998 A 1/1989 Dunbar
4,807,642 A 2/1989 Brown
4,807,643 A 2/1989 Rosier
4,817,587 A 4/1989 Janese
4,817,628 A 4/1989 Zealear
4,827,935 A 5/1989 Geddes
4,841,973 A 6/1989 Stecker
4,844,091 A 7/1989 Bellak
4,862,891 A 9/1989 Smith
4,892,105 A 1/1990 Prass
4,895,152 A 1/1990 Callaghan
4,920,968 A 5/1990 Takase
4,926,865 A 5/1990 Oman
4,926,880 A 5/1990 Claude
4,934,377 A 6/1990 Bova
4,934,378 A 6/1990 Perry, Jr.
4,934,957 A 6/1990 Bellusci

(56) References Cited

U.S. PATENT DOCUMENTS

| | | | |
|---|---|---|---|
| 4,962,766 | A | 10/1990 | Herzon |
| 4,964,411 | A | 10/1990 | Johnson |
| 4,964,811 | A | 10/1990 | Hayes, Sr. |
| 4,984,578 | A | 1/1991 | Keppel |
| 4,998,796 | A | 3/1991 | Bonanni |
| 5,007,902 | A | 4/1991 | Witt |
| 5,015,247 | A | 5/1991 | Michelson |
| 5,018,526 | A | 5/1991 | Gaston-Johansson |
| 5,020,542 | A | 6/1991 | Rossmann |
| 5,024,228 | A | 6/1991 | Goldstone |
| 5,058,602 | A | 10/1991 | Brody |
| 5,080,606 | A | 1/1992 | Burkard |
| 5,081,990 | A | 1/1992 | Deletis |
| 5,085,226 | A | 2/1992 | Deluca |
| 5,092,344 | A | 3/1992 | Lee |
| 5,095,905 | A | 3/1992 | Klepinski |
| 5,125,406 | A | 6/1992 | Goldstone |
| 5,127,403 | A | 7/1992 | Brownlee |
| 5,131,389 | A | 7/1992 | Giordani |
| 5,143,081 | A | 9/1992 | Young |
| 5,146,920 | A | 9/1992 | Yuuchi |
| 5,161,533 | A | 11/1992 | Prass |
| 5,163,328 | A | 11/1992 | Holland |
| 5,171,279 | A | 12/1992 | Mathews |
| 5,190,048 | A | 3/1993 | Wilkinson |
| 5,191,896 | A | 3/1993 | Gafni |
| 5,195,530 | A | 3/1993 | Shindel |
| 5,195,532 | A | 3/1993 | Schumacher |
| 5,196,015 | A | 3/1993 | Neubardt |
| 5,199,899 | A | 4/1993 | Ittah |
| 5,201,325 | A | 4/1993 | McEwen |
| 5,215,100 | A | 6/1993 | Spitz |
| RE34,390 | E | 9/1993 | Culver |
| 5,253,656 | A | 10/1993 | Rincoe |
| 5,255,691 | A | 10/1993 | Otten |
| 5,277,197 | A | 1/1994 | Church |
| 5,282,468 | A | 2/1994 | Klepinski |
| 5,284,153 | A | 2/1994 | Raymond |
| 5,284,154 | A | 2/1994 | Raymond |
| 5,292,309 | A | 3/1994 | Van Tassel |
| 5,299,563 | A | 4/1994 | Seton |
| 5,306,236 | A | 4/1994 | Blumenfeld |
| 5,312,417 | A | 5/1994 | Wilk |
| 5,313,956 | A | 5/1994 | Knutsson |
| 5,313,962 | A | 5/1994 | Obenchain |
| 5,327,902 | A | 7/1994 | Lemmen |
| 5,333,618 | A | 8/1994 | Lekhtman |
| 5,343,871 | A | 9/1994 | Bittman |
| 5,347,989 | A | 9/1994 | Monroe |
| 5,358,423 | A | 10/1994 | Burkhard |
| 5,358,514 | A | 10/1994 | Schulman |
| 5,368,043 | A | 11/1994 | Sunouchi |
| 5,373,317 | A | 12/1994 | Salvati |
| 5,375,067 | A | 12/1994 | Berchin |
| 5,377,667 | A | 1/1995 | Patton |
| 5,381,805 | A | 1/1995 | Tuckett |
| 5,383,876 | A | 1/1995 | Nardella |
| 5,389,069 | A | 2/1995 | Weaver |
| 5,405,365 | A | 4/1995 | Hoegnelid |
| 5,413,111 | A | 5/1995 | Wilkinson |
| 5,454,365 | A | 10/1995 | Bonutti |
| 5,470,349 | A | 11/1995 | Kleditsch |
| 5,472,426 | A | 12/1995 | Bonati |
| 5,474,558 | A | 12/1995 | Neubardt |
| 5,480,440 | A | 1/1996 | Kambin |
| 5,482,038 | A | 1/1996 | Ruff |
| 5,484,437 | A | 1/1996 | Michelson |
| 5,485,852 | A | 1/1996 | Johnson |
| 5,491,299 | A | 2/1996 | Naylor |
| 5,514,005 | A | 5/1996 | Jaycox |
| 5,514,165 | A | 5/1996 | Malaugh |
| 5,522,386 | A | 6/1996 | Lerner |
| 5,540,235 | A | 7/1996 | Wilson |
| 5,549,656 | A | 8/1996 | Reiss |
| 5,560,372 | A | 10/1996 | Cory |
| 5,565,779 | A | 10/1996 | Arakawa |
| 5,566,678 | A | 10/1996 | Cadwell |
| 5,569,248 | A | 10/1996 | Mathews |
| 5,575,284 | A | 11/1996 | Athan |
| 5,579,781 | A | 12/1996 | Cooke |
| 5,591,216 | A | 1/1997 | Testerman |
| 5,593,429 | A | 1/1997 | Ruff |
| 5,599,279 | A | 2/1997 | Slotman |
| 5,601,608 | A | 2/1997 | Mouchawar |
| 5,618,208 | A | 4/1997 | Crouse |
| 5,620,483 | A | 4/1997 | Minogue |
| 5,622,515 | A | 4/1997 | Hotea |
| 5,630,813 | A | 5/1997 | Kieturakis |
| 5,634,472 | A | 6/1997 | Raghuprasad |
| 5,671,752 | A | 9/1997 | Sinderby |
| 5,681,265 | A | 10/1997 | Maeda |
| 5,687,080 | A | 11/1997 | Hoyt |
| 5,707,359 | A | 1/1998 | Bufalini |
| 5,711,307 | A | 1/1998 | Smits |
| 5,725,514 | A | 3/1998 | Grinblat |
| 5,728,046 | A | 3/1998 | Mayer |
| 5,741,253 | A | 4/1998 | Michelson |
| 5,741,261 | A | 4/1998 | Moskovitz |
| 5,759,159 | A | 6/1998 | Masreliez |
| 5,769,781 | A | 6/1998 | Chappuis |
| 5,772,597 | A | 6/1998 | Goldberger |
| 5,772,661 | A | 6/1998 | Michelson |
| 5,775,331 | A | 7/1998 | Raymond |
| 5,776,144 | A | 7/1998 | Leysieffer |
| 5,779,642 | A | 7/1998 | Nightengale |
| 5,785,648 | A | 7/1998 | Min |
| 5,785,658 | A | 7/1998 | Benaron |
| 5,792,044 | A | 8/1998 | Foley |
| 5,795,291 | A | 8/1998 | Koros |
| 5,797,854 | A | 8/1998 | Hedgecock |
| 5,806,522 | A | 9/1998 | Katims |
| 5,814,073 | A | 9/1998 | Bonutti |
| 5,830,150 | A | 11/1998 | Palmer |
| 5,830,151 | A | 11/1998 | Hadzic |
| 5,833,714 | A | 11/1998 | Loeb |
| 5,836,880 | A | 11/1998 | Pratt |
| 5,851,191 | A | 12/1998 | Gozani |
| 5,853,373 | A | 12/1998 | Griffith |
| 5,857,986 | A | 1/1999 | Moriyasu |
| 5,860,829 | A | 1/1999 | Hower |
| 5,860,973 | A | 1/1999 | Michelson |
| 5,862,314 | A | 1/1999 | Jeddeloh |
| 5,868,668 | A | 2/1999 | Weiss |
| 5,872,314 | A | 2/1999 | Clinton |
| 5,885,210 | A | 3/1999 | Cox |
| 5,885,219 | A | 3/1999 | Nightengale |
| 5,888,196 | A | 3/1999 | Bonutti |
| 5,891,147 | A | 4/1999 | Moskovitz |
| 5,895,298 | A | 4/1999 | Faupel |
| 5,902,231 | A | 5/1999 | Foley |
| 5,924,984 | A | 7/1999 | Rao |
| 5,928,030 | A | 7/1999 | Daoud |
| 5,928,139 | A | 7/1999 | Koros |
| 5,928,158 | A | 7/1999 | Aristides |
| 5,931,777 | A | 8/1999 | Sava |
| 5,944,658 | A | 8/1999 | Koros |
| 5,954,635 | A | 9/1999 | Foley |
| 5,954,716 | A | 9/1999 | Sharkey |
| 5,993,385 | A | 11/1999 | Johnston |
| 5,993,434 | A | 11/1999 | Dev |
| 6,004,262 | A | 12/1999 | Putz |
| 6,004,312 | A | 12/1999 | Finneran |
| 6,004,341 | A | 12/1999 | Zhu |
| 6,009,347 | A | 12/1999 | Hofmann |
| 6,011,985 | A | 1/2000 | Athan |
| 6,027,456 | A | 2/2000 | Feler |
| 6,029,090 | A | 2/2000 | Herbst |
| 6,038,469 | A | 3/2000 | Karlsson |
| 6,038,477 | A | 3/2000 | Kayyali |
| 6,042,540 | A | 3/2000 | Johnston |
| 6,050,992 | A | 4/2000 | Nichols |
| 6,074,343 | A | 6/2000 | Nathanson |
| 6,077,237 | A | 6/2000 | Campbell |
| 6,095,987 | A | 8/2000 | Shmulewitz |

(56) References Cited

U.S. PATENT DOCUMENTS

| | | | |
|---|---|---|---|
| 6,104,957 | A | 8/2000 | Alo |
| 6,104,960 | A | 8/2000 | Duysens |
| 6,119,068 | A | 9/2000 | Kannonji |
| 6,120,503 | A | 9/2000 | Michelson |
| 6,126,660 | A | 10/2000 | Dietz |
| 6,128,576 | A | 10/2000 | Nishimoto |
| 6,132,386 | A | 10/2000 | Gozani |
| 6,132,387 | A | 10/2000 | Gozani |
| 6,135,965 | A | 10/2000 | Tumer |
| 6,139,493 | A | 10/2000 | Koros |
| 6,139,545 | A | 10/2000 | Utley |
| 6,146,334 | A | 11/2000 | Laserow |
| 6,146,335 | A | 11/2000 | Gozani |
| 6,152,871 | A | 11/2000 | Foley |
| 6,161,047 | A | 12/2000 | King |
| 6,181,961 | B1 | 1/2001 | Prass |
| 6,196,969 | B1 | 3/2001 | Bester |
| 6,206,826 | B1 | 3/2001 | Mathews |
| 6,210,324 | B1 | 4/2001 | Reno |
| 6,214,035 | B1 | 4/2001 | Streeter |
| 6,224,545 | B1 | 5/2001 | Cocchia |
| 6,224,549 | B1 | 5/2001 | Drongelen |
| 6,234,953 | B1 | 5/2001 | Thomas |
| 6,249,706 | B1 | 6/2001 | Sobota |
| 6,259,945 | B1 | 7/2001 | Epstein |
| 6,266,558 | B1 | 7/2001 | Gozani |
| 6,273,905 | B1 | 8/2001 | Streeter |
| 6,287,322 | B1 | 9/2001 | Zhu |
| 6,292,701 | B1 | 9/2001 | Prass |
| 6,298,256 | B1 | 10/2001 | Meyer |
| 6,302,842 | B1 | 10/2001 | Auerbach |
| 6,306,100 | B1 | 10/2001 | Prass |
| 6,309,349 | B1 | 10/2001 | Bertolero |
| 6,312,392 | B1 | 11/2001 | Herzon |
| 6,314,324 | B1 | 11/2001 | Lattner |
| 6,325,764 | B1 | 12/2001 | Griffith |
| 6,334,068 | B1 | 12/2001 | Hacker |
| 6,346,078 | B1 | 2/2002 | Ellman |
| 6,348,058 | B1 | 2/2002 | Melkent |
| 6,366,813 | B1 | 4/2002 | DiLorenzo |
| 6,391,005 | B1 | 5/2002 | Lum |
| 6,393,325 | B1 | 5/2002 | Mann |
| 6,425,859 | B1 | 7/2002 | Foley |
| 6,425,901 | B1 | 7/2002 | Zhu |
| 6,441,747 | B1 | 8/2002 | Khair |
| 6,450,952 | B1 | 9/2002 | Rioux |
| 6,451,015 | B1 | 9/2002 | Rittman, III |
| 6,461,352 | B2 | 10/2002 | Morgan |
| 6,466,817 | B1 | 10/2002 | Kaula |
| 6,487,446 | B1 | 11/2002 | Hill |
| 6,500,128 | B2 | 12/2002 | Marino |
| 6,500,173 | B2 | 12/2002 | Underwood |
| 6,500,180 | B1 | 12/2002 | Foley |
| 6,500,210 | B1 | 12/2002 | Sabolich |
| 6,507,755 | B1 | 1/2003 | Gozani |
| 6,511,427 | B1 | 1/2003 | Sliwa, Jr. |
| 6,535,759 | B1 | 3/2003 | Epstein |
| 6,543,299 | B2 | 4/2003 | Taylor |
| 6,546,271 | B1 | 4/2003 | Reisfeld |
| 6,564,078 | B1 | 5/2003 | Marino |
| 6,568,961 | B1 | 5/2003 | Liburdi |
| 6,572,545 | B2 | 6/2003 | Knobbe |
| 6,577,236 | B2 | 6/2003 | Harman |
| 6,579,244 | B2 | 6/2003 | Goodwin |
| 6,582,441 | B1 | 6/2003 | He |
| 6,585,638 | B1 | 7/2003 | Yamamoto |
| 6,609,018 | B2 | 8/2003 | Cory |
| 6,618,626 | B2 | 9/2003 | West, Jr. |
| 6,623,500 | B1 | 9/2003 | Cook |
| 6,638,101 | B1 | 10/2003 | Botelho |
| 6,692,258 | B1 | 2/2004 | Kurzweil |
| 6,712,795 | B1 | 3/2004 | Cohen |
| 6,719,692 | B2 | 4/2004 | Kleffner |
| 6,730,021 | B2 | 5/2004 | Vassiliades, Jr. |
| 6,770,074 | B2 | 8/2004 | Michelson |
| 6,805,668 | B1 | 10/2004 | Cadwell |
| 6,819,956 | B2 | 11/2004 | DiLorenzo |
| 6,839,594 | B2 | 1/2005 | Cohen |
| 6,847,849 | B2 | 1/2005 | Mamo |
| 6,851,430 | B2 | 2/2005 | Tsou |
| 6,855,105 | B2 | 2/2005 | Jackson, III |
| 6,870,109 | B1 | 3/2005 | Villarreal |
| 6,901,928 | B2 | 6/2005 | Loubser |
| 6,902,569 | B2 | 6/2005 | Parmer |
| 6,916,294 | B2 | 7/2005 | Ayad |
| 6,916,330 | B2 | 7/2005 | Simonson |
| 6,926,728 | B2 | 8/2005 | Zucherman |
| 6,929,606 | B2 | 8/2005 | Ritland |
| 6,932,816 | B2 | 8/2005 | Phan |
| 6,945,933 | B2 | 9/2005 | Branch |
| 7,024,247 | B2 | 4/2006 | Gliner |
| 7,072,521 | B1 | 7/2006 | Cadwell |
| 7,079,883 | B2 | 7/2006 | Marino |
| 7,089,059 | B1 | 8/2006 | Pless |
| 7,104,965 | B1 | 9/2006 | Jiang |
| 7,129,836 | B2 | 10/2006 | Lawson |
| 7,153,279 | B2 | 12/2006 | Ayad |
| 7,156,686 | B1 | 1/2007 | Sekela |
| 7,177,677 | B2 | 2/2007 | Kaula |
| 7,214,197 | B2 | 5/2007 | Prass |
| 7,216,001 | B2 | 5/2007 | Hacker |
| 7,230,688 | B1 | 6/2007 | Villarreal |
| 7,236,822 | B2 | 6/2007 | Dobak, III |
| 7,258,688 | B1 | 8/2007 | Shah |
| 7,261,688 | B2 | 8/2007 | Smith |
| 7,294,127 | B2 | 11/2007 | Leung |
| 7,306,563 | B2 | 12/2007 | Huang |
| 7,310,546 | B2 | 12/2007 | Prass |
| 7,363,079 | B1 | 4/2008 | Thacker |
| 7,374,448 | B2 | 5/2008 | Jepsen |
| D574,955 | S | 8/2008 | Lash |
| 7,470,236 | B1 | 12/2008 | Kelleher |
| 7,496,407 | B2 | 2/2009 | Odderson |
| 7,522,953 | B2 | 4/2009 | Kaula |
| 7,546,993 | B1 | 6/2009 | Walker |
| 7,605,738 | B2 | 10/2009 | Kuramochi |
| 7,664,544 | B2 | 2/2010 | Miles |
| 7,689,292 | B2 | 3/2010 | Hadzic |
| 7,713,210 | B2 | 5/2010 | Byrd |
| D621,041 | S | 8/2010 | Mao |
| 7,775,974 | B2 | 8/2010 | Buckner |
| 7,789,695 | B2 | 9/2010 | Radle |
| 7,789,833 | B2 | 9/2010 | Urbano |
| 7,801,601 | B2 | 9/2010 | Maschino |
| 7,824,410 | B2 | 11/2010 | Simonson |
| 7,869,881 | B2 | 1/2011 | Libbus |
| 7,878,981 | B2 | 2/2011 | Strother |
| 7,914,350 | B1 | 3/2011 | Bozich |
| 7,963,927 | B2 | 6/2011 | Kelleher |
| 7,974,702 | B1 | 7/2011 | Fain |
| 7,983,761 | B2 | 7/2011 | Giuntoli |
| 7,987,001 | B2 | 7/2011 | Teichman |
| 7,988,688 | B2 | 8/2011 | Webb |
| 7,993,269 | B2 | 8/2011 | Donofrio |
| 8,002,770 | B2 | 8/2011 | Swanson |
| 8,061,014 | B2 | 11/2011 | Smith |
| 8,068,910 | B2 | 11/2011 | Gerber |
| 8,126,736 | B2 | 2/2012 | Anderson |
| 8,137,284 | B2 | 3/2012 | Miles |
| 8,147,421 | B2 | 4/2012 | Farquhar |
| 8,160,694 | B2 | 4/2012 | Salmon |
| 8,192,437 | B2 | 6/2012 | Simonson |
| 8,255,045 | B2 | 8/2012 | Gharib |
| 8,295,933 | B2 | 10/2012 | Gerber |
| D670,656 | S | 11/2012 | Jepsen |
| 8,311,791 | B1 | 11/2012 | Avisar |
| 8,323,208 | B2 | 12/2012 | Davis |
| 8,343,079 | B2 | 1/2013 | Bartol |
| 8,374,673 | B2 | 2/2013 | Adcox |
| RE44,049 | E | 3/2013 | Herzon |
| 8,419,758 | B2 | 4/2013 | Smith |
| 8,428,733 | B2 | 4/2013 | Carlson |
| 8,457,734 | B2 | 6/2013 | Libbus |
| 8,498,717 | B2 | 7/2013 | Lee |

(56) References Cited

U.S. PATENT DOCUMENTS 8,515,520 B2 8/2013 Brunnett
8,568,312 B2 10/2013 Cusimano Reaston
8,568,317 B1 10/2013 Gharib
8,594,779 B2 11/2013 Denison
8,647,124 B2 2/2014 Bardsley
8,670,830 B2 3/2014 Carlson
8,680,986 B2 3/2014 Costantino
8,688,237 B2 4/2014 Stanislaus
8,695,957 B2 4/2014 Quintania
8,740,783 B2 6/2014 Gharib
8,753,333 B2 6/2014 Johnson
8,764,654 B2 7/2014 Chmiel
8,805,527 B2 8/2014 Mumford
8,876,813 B2 11/2014 Min
8,886,280 B2 11/2014 Kartush
8,892,259 B2 11/2014 Bartol
8,926,509 B2 1/2015 Magar
8,942,797 B2 1/2015 Bartol
8,956,418 B2 2/2015 Wasielewski
8,958,869 B2 2/2015 Kelleher
8,971,983 B2 3/2015 Gilmore
8,986,301 B2 3/2015 Wolf
8,989,855 B2 3/2015 Murphy
9,031,658 B2 5/2015 Chiao
9,037,226 B2 5/2015 Hacker
9,078,671 B2 7/2015 Beale
9,084,550 B1 7/2015 Bartol
9,084,551 B2 7/2015 Brunnett
9,119,533 B2 9/2015 Ghaffari
9,121,423 B2 9/2015 Sharpe
9,149,188 B2 10/2015 Eng
9,155,503 B2 10/2015 Cadwell
9,204,830 B2 12/2015 Zand
9,247,952 B2 2/2016 Bleich
9,295,401 B2 3/2016 Cadwell
9,295,461 B2 3/2016 Bojarski
9,339,332 B2 5/2016 Srivastava
9,352,153 B2 5/2016 Van Dijk
9,370,654 B2 6/2016 Scheiner
9,579,503 B2 2/2017 McKinney
9,616,233 B2 4/2017 Shi
9,622,684 B2 4/2017 Wybo
9,714,350 B2 7/2017 Hwang
9,730,634 B2 8/2017 Cadwell
9,788,905 B2 10/2017 Avisar
9,820,768 B2 11/2017 Gee
9,855,431 B2 1/2018 Ternes
9,913,594 B2 3/2018 Li
9,935,395 B1 * 4/2018 Jepsen ................. H01R 13/518
9,999,719 B2 6/2018 Kitchen
10,022,090 B2 7/2018 Whitman
10,039,461 B2 8/2018 Cadwell
10,039,915 B2 8/2018 McFarlin
10,092,349 B2 10/2018 Engeberg
10,154,792 B2 12/2018 Sakai
10,292,883 B2 5/2019 Jepsen
10,342,452 B2 7/2019 Sterrantino
10,349,862 B2 7/2019 Sterrantino
10,398,369 B2 9/2019 Brown
10,418,750 B2 * 9/2019 Jepsen ................... H01R 25/16
10,631,912 B2 4/2020 McFarlin
10,783,801 B1 9/2020 Beaubien
11,177,610 B2 * 11/2021 Jepsen ................... H01R 13/62
11,189,379 B2 11/2021 Giataganas
2001/0031916 A1 10/2001 Bennett
2001/0039949 A1 11/2001 Loubser
2001/0049524 A1 12/2001 Morgan
2001/0056280 A1 12/2001 Underwood
2002/0001995 A1 1/2002 Lin
2002/0001996 A1 1/2002 Seki
2002/0007129 A1 1/2002 Marino
2002/0007188 A1 1/2002 Arambula
2002/0055295 A1 5/2002 Itai
2002/0065481 A1 5/2002 Cory
2002/0072686 A1 6/2002 Hoey
2002/0095080 A1 7/2002 Cory
2002/0149384 A1 10/2002 Reasoner
2002/0161415 A1 10/2002 Cohen
2002/0183647 A1 12/2002 Gozani
2002/0193779 A1 12/2002 Yamazaki
2002/0193843 A1 12/2002 Hill
2002/0194934 A1 12/2002 Taylor
2003/0032966 A1 2/2003 Foley
2003/0045808 A1 3/2003 Kaula
2003/0078618 A1 4/2003 Fey
2003/0088185 A1 5/2003 Prass
2003/0105503 A1 6/2003 Marino
2003/0171747 A1 9/2003 Kanehira
2003/0199191 A1 10/2003 Ward
2003/0212335 A1 11/2003 Huang
2004/0019370 A1 1/2004 Gliner
2004/0034340 A1 2/2004 Biscup
2004/0068203 A1 4/2004 Gellman
2004/0135528 A1 7/2004 Yasohara
2004/0172114 A1 9/2004 Hadzic
2004/0199084 A1 10/2004 Kelleher
2004/0204628 A1 10/2004 Rovegno
2004/0225228 A1 11/2004 Ferree
2004/0229495 A1 11/2004 Negishi
2004/0230131 A1 11/2004 Kassab
2004/0260358 A1 12/2004 Vaughan
2005/0004593 A1 1/2005 Simonson
2005/0004623 A1 1/2005 Miles
2005/0075067 A1 4/2005 Lawson
2005/0075578 A1 4/2005 Gharib
2005/0080418 A1 4/2005 Simonson
2005/0085743 A1 4/2005 Hacker
2005/0119660 A1 6/2005 Bourlion
2005/0149143 A1 7/2005 Libbus
2005/0159659 A1 7/2005 Sawan
2005/0182454 A1 8/2005 Gharib
2005/0182456 A1 8/2005 Ziobro
2005/0215993 A1 9/2005 Phan
2005/0256582 A1 11/2005 Ferree
2005/0261559 A1 11/2005 Mumford
2006/0004424 A1 1/2006 Loeb
2006/0009754 A1 1/2006 Boese
2006/0025702 A1 2/2006 Sterrantino
2006/0025703 A1 2/2006 Miles
2006/0052828 A1 3/2006 Kim
2006/0069315 A1 3/2006 Miles
2006/0085048 A1 4/2006 Cory
2006/0085049 A1 4/2006 Cory
2006/0122514 A1 6/2006 Byrd
2006/0173383 A1 8/2006 Esteve
2006/0200023 A1 9/2006 Melkent
2006/0241725 A1 10/2006 Libbus
2006/0258951 A1 11/2006 Bleich
2006/0264777 A1 11/2006 Drew
2006/0276702 A1 12/2006 McGinnis
2006/0292919 A1 12/2006 Kruss
2007/0016097 A1 1/2007 Farquhar
2007/0021682 A1 1/2007 Gharib
2007/0032841 A1 2/2007 Urmey
2007/0049962 A1 3/2007 Marino
2007/0097719 A1 5/2007 Parramon
2007/0184422 A1 8/2007 Takahashi
2007/0270918 A1 11/2007 De Bel
2007/0282217 A1 12/2007 McGinnis
2008/0015612 A1 1/2008 Urmey
2008/0027507 A1 1/2008 Bijelic
2008/0039914 A1 2/2008 Cory
2008/0058606 A1 3/2008 Miles
2008/0064976 A1 3/2008 Kelleher
2008/0065144 A1 3/2008 Marino
2008/0065178 A1 3/2008 Kelleher
2008/0071191 A1 3/2008 Kelleher
2008/0077198 A1 3/2008 Webb
2008/0082136 A1 4/2008 Gaudiani
2008/0097164 A1 4/2008 Miles
2008/0167574 A1 7/2008 Farquhar
2008/0183190 A1 7/2008 Adcox
2008/0183915 A1 7/2008 Iima
2008/0194970 A1 8/2008 Steers

(56) References Cited

U.S. PATENT DOCUMENTS

| | | | |
|---|---|---|---|
| 2008/0214903 | A1 | 9/2008 | Orbach |
| 2008/0218393 | A1 | 9/2008 | Kuramochi |
| 2008/0254672 | A1 | 10/2008 | Dennes |
| 2008/0269777 | A1 | 10/2008 | Appenrodt |
| 2008/0281313 | A1 | 11/2008 | Fagin |
| 2008/0300650 | A1 | 12/2008 | Gerber |
| 2008/0306348 | A1 | 12/2008 | Kuo |
| 2009/0018399 | A1 | 1/2009 | Martinelli |
| 2009/0088660 | A1 | 4/2009 | McMorrow |
| 2009/0105604 | A1 | 4/2009 | Bertagnoli |
| 2009/0143797 | A1 | 6/2009 | Smith |
| 2009/0177112 | A1 | 7/2009 | Gharib |
| 2009/0182322 | A1 | 7/2009 | Frank |
| 2009/0197476 | A1 | 8/2009 | Wallace |
| 2009/0204016 | A1 | 8/2009 | Gharib |
| 2009/0209879 | A1 | 8/2009 | Kaula |
| 2009/0221153 | A1 | 9/2009 | Santangelo |
| 2009/0240117 | A1 | 9/2009 | Chmiel |
| 2009/0259108 | A1 | 10/2009 | Miles |
| 2009/0279767 | A1 | 11/2009 | Kukuk |
| 2009/0281595 | A1 | 11/2009 | King |
| 2009/0299439 | A1 | 12/2009 | Mire |
| 2010/0004949 | A1 | 1/2010 | O'Brien |
| 2010/0036280 | A1 | 2/2010 | Ballegaard |
| 2010/0036384 | A1 | 2/2010 | Gorek |
| 2010/0049188 | A1 | 2/2010 | Nelson |
| 2010/0106011 | A1 | 4/2010 | Byrd |
| 2010/0152604 | A1 | 6/2010 | Kaula |
| 2010/0152811 | A1 | 6/2010 | Flaherty |
| 2010/0152812 | A1 | 6/2010 | Flaherty |
| 2010/0160731 | A1 | 6/2010 | Giovannini |
| 2010/0168561 | A1 | 7/2010 | Anderson |
| 2010/0191311 | A1 | 7/2010 | Scheiner |
| 2010/0286554 | A1 | 11/2010 | Davis |
| 2010/0317989 | A1 | 12/2010 | Gharib |
| 2011/0004207 | A1 | 1/2011 | Wallace |
| 2011/0028860 | A1 | 2/2011 | Chenaux |
| 2011/0071418 | A1 | 3/2011 | Stellar |
| 2011/0082383 | A1 | 4/2011 | Cory |
| 2011/0160731 | A1 | 6/2011 | Bleich |
| 2011/0184308 | A1 | 7/2011 | Kaula |
| 2011/0230734 | A1 | 9/2011 | Fain |
| 2011/0230782 | A1 | 9/2011 | Bartol |
| 2011/0245647 | A1 | 10/2011 | Stanislaus |
| 2011/0270120 | A1 | 11/2011 | McFarlin |
| 2011/0270121 | A1 | 11/2011 | Johnson |
| 2011/0295579 | A1 | 12/2011 | Tang |
| 2011/0313530 | A1 | 12/2011 | Gharib |
| 2012/0004516 | A1 | 1/2012 | Eng |
| 2012/0071784 | A1 | 3/2012 | Melkent |
| 2012/0109000 | A1 | 5/2012 | Kaula |
| 2012/0109004 | A1 | 5/2012 | Cadwell |
| 2012/0220891 | A1 | 8/2012 | Kaula |
| 2012/0238893 | A1 | 9/2012 | Farquhar |
| 2012/0245439 | A1 | 9/2012 | Andre |
| 2012/0277780 | A1 | 11/2012 | Smith |
| 2012/0296230 | A1 | 11/2012 | Davis |
| 2013/0027186 | A1 | 1/2013 | Cinbis |
| 2013/0030257 | A1 | 1/2013 | Nakata |
| 2013/0090641 | A1 | 4/2013 | McKinney |
| 2013/0245722 | A1 | 9/2013 | Ternes |
| 2013/0261422 | A1 | 10/2013 | Gilmore |
| 2013/0267874 | A1 | 10/2013 | Marcotte |
| 2014/0058284 | A1 | 2/2014 | Bartol |
| 2014/0073985 | A1 | 3/2014 | Sakai |
| 2014/0074084 | A1 | 3/2014 | Engeberg |
| 2014/0088463 | A1 | 3/2014 | Wolf |
| 2014/0121555 | A1 | 5/2014 | Scott |
| 2014/0275914 | A1 | 9/2014 | Li |
| 2014/0275926 | A1 | 9/2014 | Scott |
| 2014/0288389 | A1 | 9/2014 | Gharib |
| 2014/0303452 | A1 | 10/2014 | Ghaffari |
| 2015/0012066 | A1 | 1/2015 | Underwood |
| 2015/0088029 | A1 | 3/2015 | Wybo |
| 2015/0088030 | A1 | 3/2015 | Taylor |
| 2015/0112325 | A1 | 4/2015 | Whitman |
| 2015/0202395 | A1 | 7/2015 | Fromentin |
| 2015/0238260 | A1 | 8/2015 | Nau, Jr. |
| 2015/0250423 | A1 | 9/2015 | Hacker |
| 2015/0311607 | A1 | 10/2015 | Ding |
| 2015/0380511 | A1 | 12/2015 | Irsigler |
| 2016/0000382 | A1 | 1/2016 | Jain |
| 2016/0015299 | A1 | 1/2016 | Chan |
| 2016/0038072 | A1 | 2/2016 | Brown |
| 2016/0038073 | A1 | 2/2016 | Brown |
| 2016/0038074 | A1 | 2/2016 | Brown |
| 2016/0135834 | A1 | 5/2016 | Bleich |
| 2016/0174861 | A1 | 6/2016 | Cadwell |
| 2016/0199659 | A1 | 7/2016 | Jiang |
| 2016/0235999 | A1 | 8/2016 | Nuta |
| 2016/0262699 | A1 | 9/2016 | Goldstone |
| 2016/0270679 | A1 | 9/2016 | Mahon |
| 2016/0287112 | A1 | 10/2016 | McFarlin |
| 2016/0287861 | A1 | 10/2016 | McFarlin |
| 2016/0317053 | A1 | 11/2016 | Srivastava |
| 2016/0339241 | A1 | 11/2016 | Hargrove |
| 2017/0056643 | A1 | 3/2017 | Herb |
| 2017/0231508 | A1 | 8/2017 | Edwards |
| 2017/0273592 | A1 | 9/2017 | Sterrantino |
| 2018/0345004 | A1 | 12/2018 | McFarlin |
| 2019/0180637 | A1 | 6/2019 | Mealer |
| 2019/0350485 | A1 | 11/2019 | Sterrantino |

FOREIGN PATENT DOCUMENTS

| | | | |
|---|---|---|---|
| AU | 607977 | B2 | 3/1991 |
| AU | 2005269287 | A1 | 2/2006 |
| AU | 2006217448 | A1 | 8/2006 |
| AU | 2003232111 | B2 | 10/2008 |
| AU | 2004263152 | B2 | 8/2009 |
| AU | 2005269287 | B2 | 5/2011 |
| AU | 2008236665 | B2 | 8/2013 |
| AU | 2012318436 | A1 | 4/2014 |
| AU | 2016244152 | A1 | 11/2017 |
| AU | 2016244152 | B2 | 12/2018 |
| AU | 2019201702 | A1 | 4/2019 |
| BR | 9604655 | C1 | 12/1999 |
| BR | 0609144 | A2 | 2/2010 |
| CA | 2144211 | C | 5/2005 |
| CA | 2229391 | C | 9/2005 |
| CA | 2574845 | A1 | 2/2006 |
| CA | 2551185 | C | 10/2007 |
| CA | 2662474 | A1 | 3/2008 |
| CA | 2850784 | A1 | 4/2013 |
| CA | 2769658 | C | 1/2016 |
| CA | 2981635 | A1 | 10/2016 |
| CN | 101018585 | A | 8/2007 |
| CN | 100571811 | C | 12/2009 |
| CN | 104066396 | A | 9/2014 |
| CN | 103052424 | B | 12/2015 |
| CN | 104080509 | B | 9/2017 |
| CN | 104717996 | B | 1/2018 |
| CN | 107666939 | A | 2/2018 |
| CN | 111419179 | A | 7/2020 |
| DE | 2753109 | A1 | 6/1979 |
| DE | 2831313 | A1 | 2/1980 |
| DE | 8803153 | U1 | 6/1988 |
| DE | 3821219 | C1 | 8/1989 |
| DE | 29510204 | U1 | 8/1995 |
| DE | 19530869 | A1 | 2/1997 |
| DE | 29908259 | U1 | 7/1999 |
| DE | 19921279 | C1 | 11/2000 |
| DE | 19618945 | C2 | 2/2003 |
| EP | 0161895 | A2 | 11/1985 |
| EP | 298268 | | 1/1989 |
| EP | 0719113 | A1 | 7/1996 |
| EP | 0759307 | A2 | 2/1997 |
| EP | 0836514 | A2 | 4/1998 |
| EP | 890341 | | 1/1999 |
| EP | 972538 | | 1/2000 |
| EP | 1656883 | A1 | 5/2006 |
| EP | 1115338 | B1 | 8/2006 |
| EP | 1804911 | A1 | 7/2007 |
| EP | 1534130 | A4 | 9/2008 |

(56) References Cited

FOREIGN PATENT DOCUMENTS

| | | | |
|---|---|---|---|
| EP | 1804911 | B1 | 1/2012 |
| EP | 2481338 | A3 | 9/2012 |
| EP | 2763616 | A1 | 8/2014 |
| EP | 1385417 | B1 | 4/2016 |
| EP | 1680177 | B1 | 4/2017 |
| EP | 3277366 | A1 | 2/2018 |
| ES | 2725489 | T3 | 9/2019 |
| FI | 73878 | C | 12/1987 |
| FR | 2624373 | A1 | 6/1989 |
| FR | 2624748 | B1 | 10/1995 |
| FR | 2796846 | A1 | 2/2001 |
| FR | 2795624 | B1 | 9/2001 |
| FR | 2835732 | B1 | 11/2004 |
| GB | 1534162 | A | 11/1978 |
| GB | 2049431 | A | 12/1980 |
| GB | 2052994 | A | 2/1981 |
| GB | 2452158 | A | 2/2009 |
| GB | 2519302 | B | 4/2016 |
| IT | 1221615 | B | 7/1990 |
| JP | H0723964 | A | 1/1995 |
| JP | 2000028717 | A | 1/2000 |
| JP | 3188437 | B2 | 7/2001 |
| JP | 2000590531 | A | 8/2003 |
| JP | 2003524452 | A | 8/2003 |
| JP | 2004522497 | A | 7/2004 |
| JP | 2008508049 | A | 3/2008 |
| JP | 4295086 | B2 | 7/2009 |
| JP | 4773377 | B2 | 9/2011 |
| JP | 4854900 | B2 | 1/2012 |
| JP | 4987709 | B2 | 7/2012 |
| JP | 5132310 | B2 | 1/2013 |
| JP | 2014117328 | A | 6/2014 |
| JP | 2014533135 | A | 12/2014 |
| JP | 6145916 | B2 | 6/2017 |
| JP | 2018514258 | A | 6/2018 |
| JP | 2018514258 | A5 | 5/2019 |
| JP | 6749338 | B2 | 9/2020 |
| KR | 100632980 | B1 | 10/2006 |
| KR | 1020070106675 | A | 11/2007 |
| KR | 100877229 | B1 | 1/2009 |
| KR | 20140074973 | A | 6/2014 |
| KR | 1020170133499 | A | 12/2017 |
| KR | 102092583 | B1 | 3/2020 |
| KR | 1020200033979 | A | 3/2020 |
| NZ | 541889 | A | 4/2010 |
| SE | 467561 | B | 8/1992 |
| SE | 508357 | C2 | 9/1998 |
| WO | 1999037359 | A1 | 7/1999 |
| WO | 2000038574 | A1 | 7/2000 |
| WO | 2000066217 | A1 | 11/2000 |
| WO | 2001037728 | A1 | 5/2001 |
| WO | 2001078831 | A2 | 10/2001 |
| WO | 2001087154 | A1 | 11/2001 |
| WO | 2001093748 | A2 | 12/2001 |
| WO | 2002082982 | A1 | 10/2002 |
| WO | 2003005887 | A2 | 1/2003 |
| WO | 2003034922 | A1 | 5/2003 |
| WO | 2003094744 | A1 | 11/2003 |
| WO | 2004064632 | A1 | 8/2004 |
| WO | 2005030318 | A1 | 4/2005 |
| WO | 2006015069 | A1 | 2/2006 |
| WO | 2006026482 | A2 | 3/2006 |
| WO | 2006042241 | A2 | 4/2006 |
| WO | 2006113394 | A2 | 10/2006 |
| WO | 2008002917 | A2 | 1/2008 |
| WO | 2008005843 | A2 | 1/2008 |
| WO | 2008097407 | A2 | 8/2008 |
| WO | 2009051965 | A1 | 4/2009 |
| WO | 2010090835 | A1 | 8/2010 |
| WO | 2011014598 | A1 | 2/2011 |
| WO | 2011150502 | A2 | 12/2011 |
| WO | 2013019757 | A2 | 2/2013 |
| WO | 2013052815 | A1 | 4/2013 |
| WO | 2013151770 | A1 | 10/2013 |
| WO | 2015069962 | A1 | 5/2015 |
| WO | 2016160477 | A1 | 10/2016 |

OTHER PUBLICATIONS

Deletis et al., “The role of intraoperative neurophysiology in the protection or documentation of surgically induced injury to the spinal cord”, Correspondence Address: Hyman Newman Institute for Neurology & Neurosurgery, Beth Israel Medical Center, 170 East End Ave., Room 311, NY 10128.

Calancie, et. al., Stimulus-Evoked EMG Monitoring During Transpedicular Lumbosacral Spine Instrumentation, Initial Clinical Results, 19 (24):2780-2786 (1994).

Lenke, et. al., “Triggered Electromyographic Threshold for Accuracy of Pedicle Screw Placement, An Animal Model and Clinical Correlation”, 20 (14):1585-1591 (1995).

Raymond, et. al., “The NerveSeeker: A System for Automated Nerve Localization”, Regional Anesthesia 17:151-162 (1992).

Hinrichs, et al., “A trend-detection algorithm for intraoperative EEG monitoring”, Med. Eng. Phys. 18 (8):626-631 (1996).

Raymond J. Gardocki, MD, “Tubular diskectomy minimizes collateral damage”, AAOS Now, Sep. 2009 Issue, http://www.aaos.org/news/aaosnow/sep09/clinical12.asp.

Butterworth et. al., “Effects of Halothane and Enflurane on Firing Threshold of Frog Myelinated Axon”, Journal of Physiology 411:493-516, (1989) From the Anesthesia Research Labs, Brigham and Women’s Hospital, Harvard Medical School, 75 Francis St., Boston, MA 02115, jp.physoc.org.

Rose et al., “Persistently Electrified Pedicle Stimulation Instruments in Spinal Instrumentation: Technique and Protocol Development”, Spine: 22(3): 334-343 (1997).

Minahan, et. al., “The Effect of Neuromuscular Blockade on Pedicle Screw Stimulation Thresholds” 25(19):2526-2530 (2000).

Lomanto et al., “7th World Congress of Endoscopic Surgery” Singapore, Jun. 1-4, 2000 Monduzzi Editore S.p.A.; email: monduzzi@monduzzi.com, pp. 97-103 and 105-111.

H.M. Mayer, “Minimally Invasive Spine Surgery, A Surgical Manual”, Chapter 12, pp. 117-131 (2000).

Holland, et al., “Continuous Electromyographic Monitoring to Detect Nerve Root Injury During Thoracolumbar Scoliosis Surgery”, 22 (21):2547-2550 (1997), Lippincott-Raven Publishers.

Bergey et al., “Endoscopic Lateral Transpsoas Approach to the Lumbar Spine”, SPINE 29 (15):1681-1688 (2004).

Holland, “Spine Update, Intraoperative Electromyography During Thoracolumbar Spinal Surgery”, 23 (17):1915-1922 (1998).

Dezawa et al., “Retroperitoneal Laparoscopic Lateral Approach to the Lumbar Spine: A New Approach, Technique, and Clinical Trial”, Journal of Spinal Disorders 13(2):138-143 (2000).

Greenblatt, et. al., “Needle Nerve Stimulator-Locator”, 41 (5):599-602 (1962).

Goldstein, et. al., “Minimally Invasive Endoscopic Surgery of the Lumbar Spine”, Operative Techniques in Orthopaedics, 7 (1):27-35 (1997).

Epstein, et al., “Evaluation of Intraoperative Somatosensory-Evoked Potential Monitoring During 100 Cervical Operations”, 18(6):737-747 (1993), J.B. Lippincott Company.

Glassman, et. al., “A Prospective Analysis of Intraoperative Electromyographic Monitoring of Pedicle Screw Placement with Computed Tomographic Scan Confirmation”, 20(12):1375-1379.

Reidy, et. al., “Evaluation of electromyographic monitoring during insertion of thoracic pedicle screws”, British Editorial Society of Bone and Joint Surgery 83 (7):1009-1014, (2001).

Dickman, et al., “Techniques in Neurosurgery”, National Library of Medicine, 3 (4) 301-307 (1997).

Michael R. Isley, et. al., “Recent Advances in Intraoperative Neuromonitoring of Spinal Cord Function: Pedicle Screw Stimulation Techniques”, Am. J. End Technol. 37:93-126 (1997).

Bertagnoli, et. al., “The AnteroLateral transPsoatic Approach (ALPA), A New Technique for Implanting Prosthetic Disc-Nucleus Devices”, 16 (4):398-404 (2003).

(56) References Cited

OTHER PUBLICATIONS

Mathews et al., "Laparoscopic Discectomy With Anterior Lumbar Interbody Fusion, A Preliminary Review", 20 (16):1797-1802, (1995), Lippincott-Raven Publishers.
MaGuire, et. al., "Evaluation of Intrapedicular Screw Position Using Intraoperative Evoked Electromyography", 20 (9):1068-1074 (1995).
Pimenta et. al., "Implante de prótese de núcleo pulposo: análise inicial", J Bras Neurocirurg 12 (2):93-96, (2001).
Kossmann, et. al., "Minimally Invasive Vertebral Replacement with Cages in Thoracic and Lumbar Spine", European Journal of Trauma, 2001, No. 6, pp. 292-300.
Kossmann et al., "The use of a retractor system (SynFrame) for open, minimal invasive reconstruction of the anterior column of the thoracic and lumbar spine", 10:396-402 (2001).
Kevin T. Foley, et. al., "Microendoscipic Discectomy" Techniques in Neurosurgery, 3:(4):301-307, © 1997 Lippincott-Raven Publishers, Philadelphia.
Hovey, A Guide to Motor Nerve Monitoring, pp. 1-31 Mar. 20, 1998, The Magstim Company Limited.
Danesh-Clough, et. al., "The Use of Evoked EMG in Detecting Misplaced Thoracolumbar Pedicle Screws", 26(12):1313-1316 (2001).
Clements, et. al., "Evoked and Spontaneous Electromyography to Evaluate Lumbosacral Pedicle Screw Placement", 21 (5):600-604 (1996).
Aage R. Møller, "Intraoperative Neurophysiologic Monitoring", University of Pittsburgh, School of Medicine Pennsylvania, © 1995 by Harwood Academic Publishers GmbH.
Calancie, et. al., "Threshold-level multipulse transcranial electrical stimulation of motor cortex for intraoperative monitoring of spinal motor tracts: description of method and comparison to somatosensory evoked potential monitoring" J Neurosurg 88:457-470 (1998).
Urmey "Using the nerve stimulator for peripheral or plexus nerve blocks" Minerva Anesthesiology 2006; 72:467-71.
Digitimer Ltd., 37 Hydeway, Welwyn Garden City, Hertfordshire. AL7 3BE England, email:sales@digitimer.com, website: www.digitimer.com, "Constant Current High Voltage Stimulator, Model DS7A, for Percutaneous Stimulation of Nerve and Muscle Tissue".
Carl T. Brighton, "Clinical Orthopaedics and Related Research", Clinical Orthopaedics and related research No. 384, pp. 82-100 (2001).
Teresa Riordan "Patents; A businessman invents a device to give laparoscopic surgeons a better view of their work", New York Times www.nytimes.com/2004/29/business/patents-businessman-invents-device-give-la (Mar. 2004).
Bose, et. al., "Neurophysiologic Monitoring of Spinal Nerve Root Function During Instrumented Posterior Lumbar Spine Surgery", 27 (13):1440-1450 (2002).
Chapter 9, "Root Finding and Nonlinear Sets of Equations", Chapter 9:350-354, http://www.nr.com.
Welch, et. al., "Evaluation with evoked and spontaneous electromyography during lumbar instrumentation: a prospective study", J Neurosurg 87:397-402, (1997).
Medtronic, "Nerve Integrity Monitor, Intraoperative EMG Monitor, User's Guide", Medtronic Xomed U.K. Ltd., Unit 5, West Point Row, Great Park Road, Almondsbury, Bristol B5324QG, England, pp. 1-39.
Ford et al., Electrical characteristics of peripheral nerve stimulators, implications for nerve localization, Dept. of Anesthesia, University of Cincinnati College of Medicine, Cincinnati, OH 45267, pp. 73-77.
Zouridakis, et. al., "A Concise Guide to Intraoperative Monitoring", Library of Congress card No. 00-046750, Chapter 3, p. 21, chapter 4, p. 58 and chapter 7 pp. 119-120.
Toleikis, et. al., "The usefulness of Electrical Stimulation for Assessing Pedicle Screw Placements", Journal of Spinal Disorders, 13 (4):283-289 (2000).
U.Schick, et. al., "Microendoscopic lumbar discectomy versus open surgery: an intraoperative EMG study", pp. 20-26, Published online: Jul. 31, 2001 © Springer-Verlag 2001.
Vaccaro, et. al., "Principles and Practice of Spine Surgery", Mosby, Inc. © 2003, Chapter 21, pp. 275-281.
Vincent C. Traynelis, "Spinal arthroplasty", Neurosurg Focus 13 (2):1-7. Article 10, (2002).
Cadwell et al. "Electrophysiologic Equipment and Electrical Safety" Chapter 2, Electrodiagnosis in Clinical Neurology, Fourth Edition; Churchill Livingstone, p. 15, 30-31; 1999.
Ott, "Noise Reduction Techniques in Electronic Systems" Second Edition; John Wiley & Sons, p. 62, 1988.
Stecker et al. "Strategies for minimizing 60 Hz pickup during evoked potential recording", Electroencephalography and clinical Neurophysiology 100 (1996) 370-373.
Wood et al. "Comparative analysis of power-line interference between two- or three-electrode biopotential amplifiers" Biomedical Engineering, Med. & Biol. Eng. & Comput., 1995, 33, 63-68.
Review of section 510(k) premarket notification for "K013215: NuVasive NeuroVision JJB System", Department of Health and Human Services, FDA, Oct. 16, 2001.
International Search Report for PCT/US2005/026692, dated Nov. 16, 2005.
International Search Report for PCT/US2016/023903, dated Sep. 6, 2016.

* cited by examiner

METHODS FOR CONCURRENTLY FORMING MULTIPLE ELECTRICAL CONNECTIONS IN A NEURO-MONITORING SYSTEM

CROSS-REFERENCE

The present application is a continuation application of U.S. patent application Ser. No. 16/532,739, entitled "Neuromonitoring Connection System" and filed on Aug. 6, 2019, which is a continuation application of U.S. patent application Ser. No. 15/900,718, entitled "Mass Connection Plate for Electrical Connectors", filed on Feb. 20, 2018, and issued as U.S. Pat. No. 10,418,750 on Sep. 17, 2019, which is a continuation application of U.S. patent application Ser. No. 15/413,051, of the same title, filed on Jan. 23, 2017, and issued as U.S. Pat. No. 9,935,395 on Apr. 3, 2018, all of which are herein incorporated by reference in their entirety.

FIELD

The present specification generally relates to the field of electrical connections in medical devices and more specifically to a system and method for coupling a group of electrical connectors with their respective mating units.

BACKGROUND

Several medical procedures involve deploying multiple sensors on the human body for the recording and monitoring of data required for patient care. Information, such as vital health parameters, cardiac activity, bio-chemical activity, electrical activity in the brain, gastric activity and physiological data, is usually recorded through on-body or implanted sensors/electrodes which are controlled through a wired or wireless link. Typical patient monitoring systems comprise multiple electrodes that are coupled to a control unit of the medical system through electrical connectors. The various electrical connectors are coupled to their respective mating units or sockets located within the control unit. Several other medical apparatuses, which may not be specifically used for patient monitoring, also involve connecting multiple electrical leads with the control unit of the medical system. In all such medical systems involving a large number of electrical connectors, the overall set up, placement and management of connectors and the corresponding wire leads is a time consuming, cumbersome, and potentially inexact process.

Neuromonitoring involves the use of electrophysiological methods, such as electroencephalography (EEG), electromyography (EMG), and evoked potentials, to monitor the functional integrity of certain neural structures (e.g., nerves, spinal cord and parts of the brain) during surgery. Generally, neuromonitoring medical procedures such as EEG involve a large number of electrodes coupled to the human body. In an EEG procedure, the electrodes are used to record and monitor the electrical activity corresponding to various parts of the brain for detection and treatment of various ailments such as epilepsy, sleep disorders and coma. The EEG procedure is either non-invasive or invasive. In non-invasive EEG, a number of electrodes are deployed on the human scalp for recording electrical activity in portions of the underlying brain. In invasive EEG, through surgical intervention, the electrodes are placed directly over sections of the brain, in the form of a strip or grid, or are positioned in the deeper areas of the brain. The electrical activity pattern captured by various electrodes is analyzed using standard algorithms to localize or spot the portion of brain which is responsible for causing the specific ailment. In both invasive and non-invasive EEG, each of the electrodes is coupled to a wire lead which, in turn, is coupled through a respective electrical connector to a control unit adapted to receive and transmit the electrical signals. Medical procedures, such as EEG, usually involve "Touch Proof" electrical connectors which comprise a simple singe-conductor connector in which the metal part is completely shrouded in plastic. The EEG DIN connector also referred to as DIN 42802 or EEG safety DIN connector is a de facto standard for connecting medical and biomedical recording systems, such as electrodes to amplifiers and other medical devices. The two types of EEG DIN connectors usually include touch-proof sockets that surround in-line rigid plugs.

The current systems and methods used for coupling multiple electrical connectors, such as the touch-proof DIN connectors, with the control unit of a medical system suffer from several drawbacks. Firstly, connecting each individual electrical connector is a very time consuming process when the number of electrical connectors is large, as in the case of neuro-monitoring applications. Secondly, while connecting a large number of electrical connectors with their respective mating or receiving sockets, it is possible that the provider or clinician plugs an electrical connector into a wrong receiving socket. Thirdly, each electrical connector is independently coupled to its respective receiving socket and there is no support structure to ensure that the connector is not displaced or misaligned from its original position. Sometimes, the electrical connector may become displaced from its position and tend to partially protrude from the receiving socket leading to a loose electrical connection.

Such errors in electrode connection and placement while performing a medical procedure can negatively impact patient care. Ensuring the integrity of the system requires thorough testing to ensure that connections are correct. Therefore, in high density electrode configurations, the connection corresponding to each electrode needs to be separately established and verified for integrity before starting the procedure which increases the set up time. To save time, in practice, the provider or clinician may skip at least part of the testing procedure which can impact the quality of medical care.

Therefore, current medical devices involving a large number of electrical connections do not provide an easy and convenient way for a medical care giver to deploy such systems. These systems suffer from a significant risk of error due to unreliable measurements because of incorrect connections. Further, deployment of such systems is time consuming which hinders following best practices and therefore compromises the quality of medical care.

To ensure that medical devices work accurately, especially in critical applications, engineers must design systems that are reliable and maintain signal fidelity. Systems and devices are required which can provide a reliable interconnection between the electrodes deployed on the body of the patient and the control unit of the medical device.

Devices and systems are required which are convenient to use and do not consume too much time for deployment. Systems are required which enable the connection of multiple electrical connectors with their respective receiving units in groups rather than separately connecting each wire lead. Further, there is a need for interconnection structures which can support the electrical connectors in a correct position, thus preventing displacement and misalignment.

SUMMARY

The following embodiments and aspects thereof are described and illustrated in conjunction with systems, tools and methods which are meant to be exemplary and illustrative, not limiting in scope.

In some embodiments, the present specification discloses a connection plate for connecting multiple electrical connectors with a medical device comprising: a middle planar section comprising a top edge, a bottom edge, a first side edge and a second side edge, wherein said middle planar section further comprises a plurality of protruding portions extending outward from the top edge, wherein each protruding portion of the plurality of protruding portions is separated from an adjacent protruding portion of the plurality of protruding portions by a space and wherein each space is adapted to receive a middle portion of an electrical connector; a proximal ledge section coupled to said middle planar section and extending outward in a first direction that is substantially perpendicular to the plurality of protruding portions, wherein the proximal ledge section comprises a first plurality of receiving areas adapted to receive a proximal portion of said electrical connector; and a distal section coupled to said middle planar section and extending outward in a second direction that is substantially perpendicular to the plurality of protruding portions and in opposition to the first direction, wherein the distal section comprises a second plurality of receiving areas adapted to receive a distal portion of said electrical connector.

Optionally, each of the first plurality of receiving areas comprises a curved surface and wherein each of the first plurality of receiving areas is aligned with one of said spaces adapted to receive a middle portion of an electrical connector.

Optionally, each of the first plurality of receiving areas is separated from an adjacent one of the first plurality of receiving areas by a planar surface such that a curved surface of one of the first plurality of receiving areas connects to a curved surface of a second of the first plurality of receiving areas by a flat surface.

Optionally, each of the plurality of protruding portions aligns with one of said planar surfaces separating each of the first plurality of receiving areas.

Optionally, each of the second plurality of receiving areas is aligned with one of said spaces adapted to receive a middle portion of an electrical connector.

Optionally, each of the plurality of protruding portions comprises atraumatic edges.

Optionally, each of the plurality of protruding portions comprises a bottom edge attached to the middle planar section and a curved top edge.

Optionally, each space adapted to receive a middle portion of an electrical connector has a first length, each of the first plurality of receiving areas adapted to receive a proximal portion of an electrical connector has a second length, and each of the second plurality of receiving areas adapted to receive a distal portion of an electrical connector has a third length, wherein, in combination, the first, second, and third lengths are less than 0.800 inches.

Optionally, said middle planar section further comprises a second plurality of protruding portions extending outward from the bottom edge, wherein each protruding portion of the second plurality of protruding portions is separated from an adjacent protruding portion of the second plurality of protruding portions by a space and wherein each space is adapted to receive a middle portion of a second electrical connector.

Optionally, the connection plate further comprises a second proximal ledge section coupled proximate to the bottom edge of said middle planar section and extending outward in a third direction that is substantially perpendicular to the second plurality of protruding portions, wherein the second proximal ledge section comprises a third plurality of receiving areas adapted to receive a proximal portion of said second electrical connector.

Optionally, the connection plate further comprises a second distal section coupled proximate to the bottom edge of said middle planar section and extending outward in a fourth direction that is substantially perpendicular to the second plurality of protruding portions and in opposition to the third direction, wherein the second distal section comprises a fourth plurality of receiving areas adapted to receive a distal portion of said second electrical connector.

Optionally, each of said plurality of protruding portions are configured as a curved extension and are separated from each other by a curved well.

Optionally, at least a portion of the second plurality of receiving areas comprise a hook to lock said electrical connector in a fixed position.

Optionally, said connection plate is a unitary piece produced using an injection molding process.

Optionally, the distal section further comprises a protruding portion coupled to the distal section that facilitates a correct insertion of the connection plate in the medical device.

In some embodiments, the present specification discloses a multiple electrical connector connection plate for connecting multiple electrical connectors with their corresponding connection ports in a medical device comprising: a middle planar section comprising a first side edge, a second side edge, a third side edge and a fourth side edge, wherein said middle planar section further comprises a plurality of alternating curved members and wells positioned along at least one said side edges, wherein each of said wells is adapted to receive a middle portion of an electrical connector; a ledge coupled proximally to said middle planar section and comprising a second plurality of wells with each well of said second plurality of wells aligned to a corresponding wells in the middle planar section, wherein each of said second plurality of wells is configured to receive a proximal section of said electrical connector; and, a keyhole extending outward from each well in the middle planar section and configured to receive a distal portion of said electrical connector.

Optionally, said keyhole is partially enclosed. Still optionally, said keyhole is wholly enclosed.

In some embodiments, the present specification discloses a method of connecting multiple electrical connectors to corresponding connection ports in a medical device comprising: providing a connection plate having a middle planar section comprising a plurality of protruding portions extending outward from an edge of said middle planar section, wherein each protruding portion of the plurality of protruding portions is separated from an adjacent protruding portion of the plurality of protruding portions by a space and wherein each space is adapted to receive a middle portion of an electrical connector; a proximal portion coupled to said middle planar section and extending outward in a first direction that is substantially perpendicular to the plurality of protruding portions, wherein the proximal section comprises a first plurality of receiving areas adapted to receive a proximal portion of said electrical connector; and a distal portion coupled to said middle planar section and extending outward in a second direction that is substantially perpendicular to the plurality of protruding portions and in opposition to the first direction, wherein the distal portion comprises a second plurality of receiving areas adapted to receive a distal portion of said electrical connector; positioning a plurality of electrical connectors in said connection plate by taking each individual electrical connector of said plurality of electrical connectors, placing a distal end of each individual electrical connector of said plurality of electrical connectors onto one of said second plurality of receiving areas, placing a middle portion of each individual electrical connector of said plurality of electrical connectors onto one of said spaces, and placing a proximal portion of each individual electrical connector of said plurality of electrical connectors onto one of said first plurality of receiving areas; and after positioning all of said plurality of electrical connectors in said connection plate, placing said connection plate with said plurality of electrical connectors proximate the connection ports of the medical device such that the distal end of each individual electrical connector of said plurality of electrical connectors is aligned with one of said connection ports of the medical device; and pushing the connection plate toward the medical device such that each individual electrical connector of said plurality of electrical connectors establishes a sufficient connection with one of said connection ports of the medical device.

Optionally, at least 0.350 inches of each individual electrical connector enters into one of said connection ports.

Optionally, said pushing of the connection plate serves to concurrently establish a sufficient connection between all of said plurality of electrical connectors and each corresponding connection port, without requiring individual electrical connectors of said plurality of electrical connectors to be separately pushed into its corresponding connection port.

Optionally, the method further comprises removing the plurality of electrical connectors from the medical device by pulling the connection plate to remove the plurality of electrical connectors from their corresponding connection ports, wherein said pulling of the connection plate serves to concurrently disconnect all of said plurality of electrical connectors and their corresponding connection ports, without requiring individual electrical connectors of said plurality of electrical connectors to be separately pulled out from its corresponding connection port.

Optionally, the method further comprises removing the connection plate from the medical device by pulling the connection plate, wherein said pulling of the connection plate serves to release the connection plate from said plurality of electrical connectors, without causing said plurality of electrical connectors to be removed from their corresponding connection ports.

Optionally, said pushing of the connection plate serves to concurrently snap lock all of said plurality of electrical connectors into each corresponding connection port, without requiring individual electrical connectors of said plurality of electrical connectors to be separately snap locked into its corresponding connection port.

Optionally, each of said protruding portions in said middle planar section is configured to prevent a horizontal movement of the electrical connector.

Optionally, each of said spaces in said middle planar section is configured to prevent a vertical movement of the electrical connector.

Optionally, each of said proximal sections is configured to prevent a vertical movement of the electrical connector.

BRIEF DESCRIPTION OF THE DRAWINGS

The foregoing and other objects and advantages will be apparent upon consideration of the following detailed description, taken in conjunction with the accompanying drawings, in which like reference characters refer to like parts throughout.

DETAILED DESCRIPTION

The present specification describes an improved system and method for connecting electrical connectors to medical devices. Systems are disclosed through which the overall set up, placement and management of electrical connectors is convenient and less time consuming. In embodiments, the electrical connectors are handled in groups such that a group of electrical connectors is plugged into or removed from a corresponding receiving or mating unit located within a medical device as a single unit. The present specification discloses a Mass Connection Plate (MCP) which acts as an intermediate connector or enabler to quickly engage or disengage a group of electrical connectors with their respective receiving or mating units located within a medical device. As the electrical connectors are secured by the MCP as a group, the likelihood of plugging a connector in a wrong receiving socket on the medical device is significantly less than compared to that in the conventional systems in which connectors are individually and directly connected with their respective receiving sockets.

In embodiments, the MCP allows an electrical connector to be securely positioned so that the electrical connector does not pull or push free from its position upon insertion or removal of the connection plate from the medical device. In embodiments, the MCP is configured to be attached or detached form a corresponding medical device with a simple push or pull action, respectively.

In various embodiments, the shapes and dimensions of different sections of a MCP are customized based on corresponding shapes and dimensions of electrical connectors and the mating device.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

It should be noted herein that any feature or component described in association with a specific embodiment may be used and implemented with any other embodiment unless clearly indicated otherwise.

Figure 1:
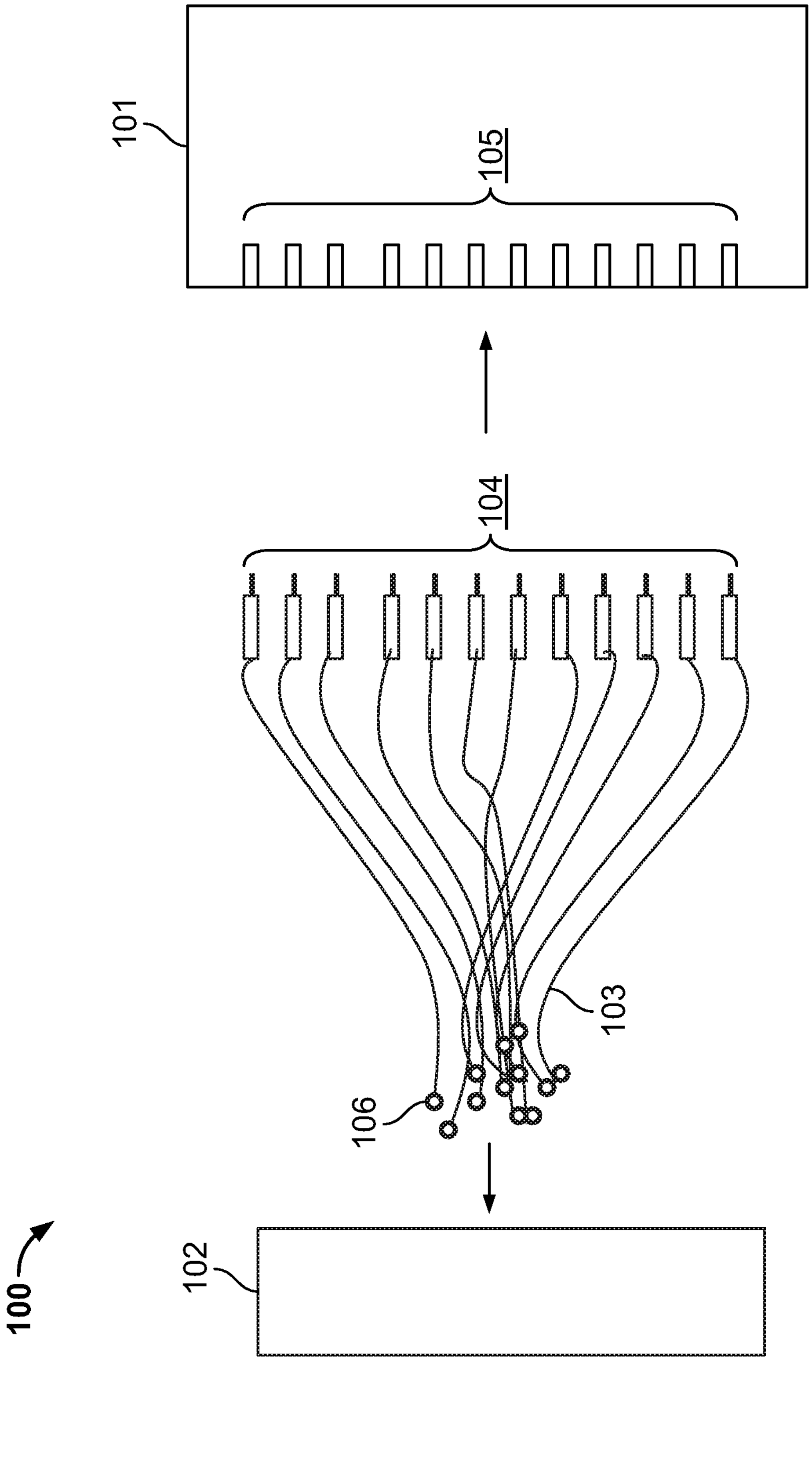
FIG. 1 (Prior Art)
FIG. 1 is a block diagram of conventional medical system comprising a large number of electrical connectors.

FIG. 1 is an illustration of a block diagram of conventional medical system comprising a large number of electrical connectors. As shown in FIG. 1, the medical system 100 is a typical patient monitoring system which comprises a control unit 101 configured to be coupled to a patient 102 through multiple electrodes 106 which can be deployed on the body of the patient 102. The electrodes 106 are coupled to the control unit 101 through a plurality of electrical leads 103, wherein each electrical lead 103 comprises the electrode 106 at its distal end and an electrical connector 104 at its proximal end. The plurality of electrical connectors 104 are configured to be coupled with the corresponding mating or receiving units 105 present in the control unit 101. In conventional medical systems such as medical system 100 where both the number of electrodes and the corresponding number of electrical connectors is large, it is inconvenient and time consuming to couple each electrical connector with its corresponding receiving unit in the control unit.

As shown in FIG. 1, the electrical wires 103 may also become entangled with each other which further complicates the procedure. In neuro-monitoring applications, such as EEG which sometimes involves over 200 electrodes, handling 200 plus electrical wires is a very cumbersome process. There is likelihood that the provider or clinician will insert an electrical connector in a wrong socket which can negatively impact the accuracy of treatment. Further, when any connector is directly inserted in a corresponding receiving unit, there is no support structure to hold the electrical connector in its respective position. Sometimes, in the absence of any structural support, the electrical connectors are displaced from their position and tend to partially come out of the receiving sockets leading to a loose electrical connection.

The system disclosed in FIG. 1 highlights the challenges in handling large number of electrical connectors in a patient monitoring system. Similar problems exist in other types of medical systems in which the connection between various system sub-components involves a large number of electrical connectors.

Figure 2:
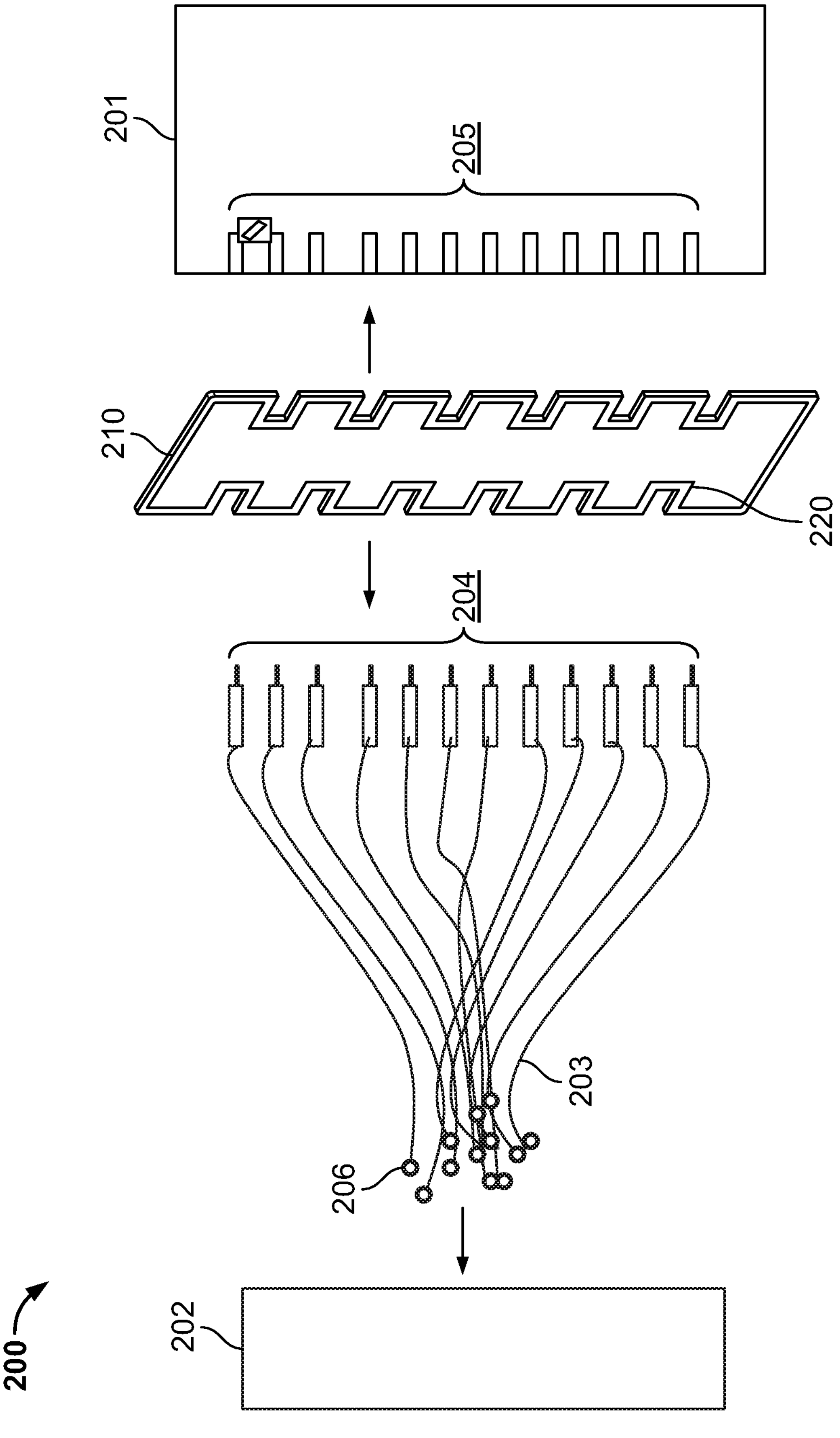
FIG. 2 is a block diagram of a medical system comprising a large number of electrical connectors coupled with an intermediate connection plate in accordance with an embodiment of the present specification.

FIG. 2 is a block diagram of an illustrative medical system 200 comprising a large number of electrical connectors coupled using an intermediate connection plate in accordance with an embodiment of the present specification. As shown in FIG. 2, the medical system 200 is a typical patient monitoring system which comprises a control unit 201 configured to be coupled to a patient 202 through multiple electrodes 206 which can be deployed on the body of the patient 202. The electrodes 206 are coupled to the control unit 201 through a plurality of electrical leads 203, wherein each electrical lead 203 comprises the electrode 206 at its distal end and an electrical connector 204 at its proximal end. The plurality of electrical connectors 204 are coupled to corresponding mating or receiving units 205 located within the control unit 201 through an intermediate connection plate 210 that comprises a plurality of channels or groves 220. In embodiments, the intermediate connection plate 210 is a solid structure which is coupled to multiple electrical connectors 204 that fit into a plurality of channels 220 provided in the intermediate connection plate 210. Thus, the intermediate connection plate 210 comprises a series of channels or grooves 220 which allow electrical connectors be positioned into these channels. The intermediate connection plate 210 houses and aggregates the multiple electrical connectors 204 as a group and is subsequently coupled to the control unit 201. In embodiments, the intermediate connection plate 210 comprises a monolithic structure manufactured using injection molding. As the intermediate connection plate 210 is connected to the control unit 201, the group of connectors 204 positioned within its channels 220 is received into the corresponding receiving sockets 205 located within the control unit 201.

The intermediate connection plate shown in FIG. 2 is advantageous as it allows for multiple electrical connectors to be coupled to itself so that these connectors are handled together as a group. Thus, the overall set-up, placement and management of electrical connectors is convenient and facile. Further, the intermediate connection plate 210 provides structural support to hold various electrical connectors in their respective positions once they are coupled with the corresponding receiving sockets located within the control unit. In embodiments, the channels or grooves provided in the intermediate connection plate 210 are adapted to receive the electrical connectors such that the electrical connectors remain firm in their position once they are fitted into these channels. Therefore, using an intermediate connection plate 210 such as the one described in FIG. 2 also prevents loosening of electrical connections and enhances the reliability of system. In the disclosed system, as the electrical connectors are handled in groups, it is also less likely that a connector is inserted in a wrong mating socket.

In the above embodiment, the electrical connectors 204 are shown as electrical male connectors and the mating units 205 are shown as the electrical female connectors, however in other embodiments, different possible configuration are used.

Figure 3:
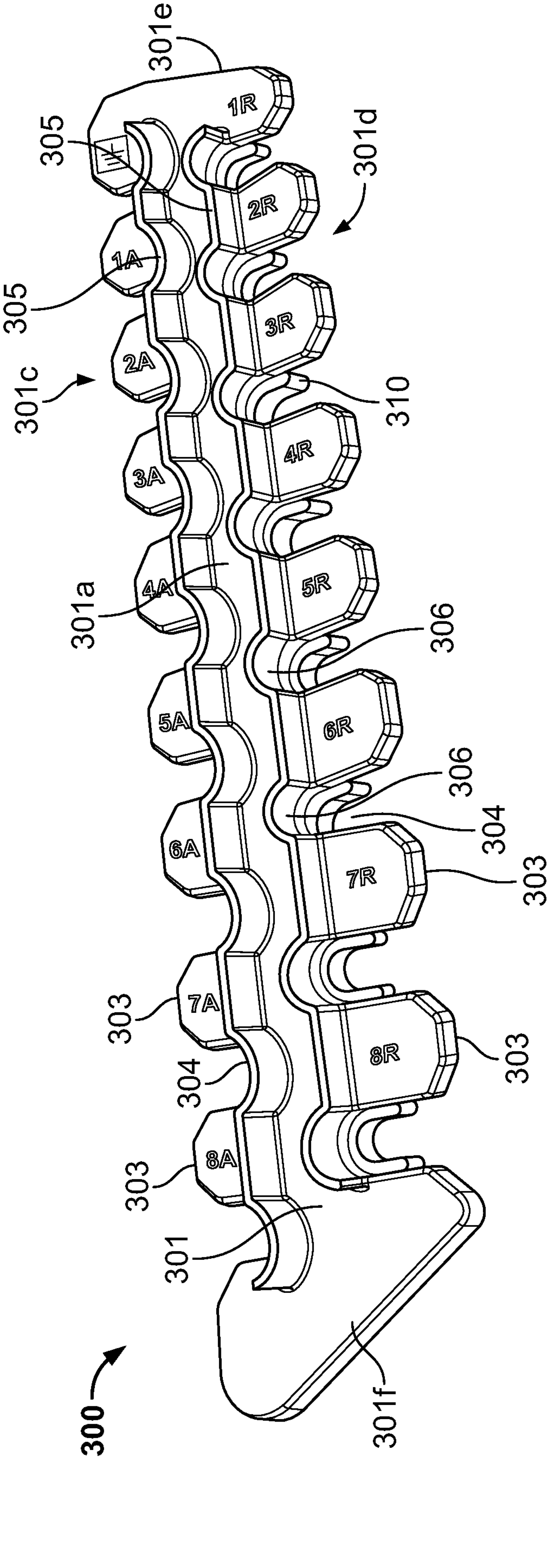
FIG. 3 is a pictorial view of an exemplary intermediate connection plate in accordance with an embodiment.

FIG. 3 is a pictorial view of an exemplary intermediate/mass connection plate in accordance with an embodiment. In embodiments, the intermediate connection plate 300 comprises a series of channels or grooves which allow electrical connectors such as the touch-proof connectors to snap and lock into these channels. As shown in FIG. 3, in the middle of the intermediate connection plate 300 is a large, primary planar surface 301 that comprises a series of hills 303 and first wells 304, each first well 304 being configured to receive a middle portion of a touch-proof connector. Proximal from the middle planar section 301 is a ledge 305 that comprises a series of u-shaped portions or second wells 306, each second well 306 matching the position of a first well 304 in the middle planar section 301. Each second well 306 is configured to receive a proximal portion of an individual touch-proof connector. Jetting outward from each first well 304 is a keyhole/receiving portion 310, smaller than the first well 304, which is positioned between the middle planar section 301 and the medical device and is configured to receive a distal end of the touch-proof connector.

The middle planar section 301 comprises a front section 301*a* and a back section (not visible in the figure). The middle planar section 301 further comprises a top edge section 301*e*, a bottom edge section 301*f*, a first side edge section 301*c* and a second side edge section 301*d*. The middle planar section 301 is configured such that it comprises the above described series of hills 303 and first wells 304 along the first side edge section 301*c* and the second side edge section 301*d*.

The intermediate connection plate 300 is configured such that the proximal section of an electrical connector is received in a second well 306 carved into ledge 305 and the distal section of the electrical connector passes through a corresponding first well 304 of the middle planar section 301 where it is received in one of the plurality of keyholes/receiving sections 310. Therefore, each matching combination of a second well 306, a first well 304 and a keyhole/receiving section 310 together comprise a single, unified channel in the MCP 300 in which one electrical connector can be positioned. By way of example, in embodiments, the u-shaped portions or second wells 306 positioned within the ledge 305 have a diameter ranging between 0.148 and 0.150 inches.

In embodiments, the various keyholes/receiving sections 310 are adapted to receive the distal portions of the electrical connectors respectively and also provide support to hold the electrical connectors firmly in their respective positions.

In embodiments, the intermediate connection plate 300 has a monolithic structure in which the various sections are all seamlessly coupled to each other through injection molding. In embodiments, the connection plate 300 is manufactured using plastic. In embodiments, the connection plate 300 is manufactured using impact resistant materials that can withstand a sudden high force or shock. In embodiments, the connection plate 300 is disposable.

The intermediate connection plate or mass connection plate 300 allows a user to quickly connect or disconnect a group of electrodes from a medical device as a single unit which makes the entire process of set up, placement and management of electrical connectors convenient and efficient. The system is especially helpful when a patient is required to be repositioned on the operating table. Further, as the electrical connectors are secured by the MCP 300 as a group, the likelihood of plugging a connector into an incorrect receiving socket on the medical device is significantly less than compared to that in conventional systems in which the connectors are individually and directly connected with respective receiving sockets.

The MCP 300 also holds the electrical connectors firmly in place and prevents individual connectors from partially protruding out of the receiving sockets. In embodiments, the MCP 300 comprises a plastic plate with custom designed geometries that allow the connectors to easily snap or lock into respective channels located in the MCP 300. Once a connector is snapped into its desired location, it is held there until all other connectors are also snapped into the mass connection plate. In typical conventional systems, the ungrouped connectors are individually fully inserted into the corresponding receiving sockets up to the large major diameter of the connectors. With the MCP 300, part of this typical insertion depth is utilized to fully snap onto the MCP 300 thereby allowing the connector to be slightly less than fully mated, while still making good/sufficient contact with the corresponding mating device. Usually, the insertion depth of connectors utilized for coupling them with a mass connection plate is equal to the corresponding thickness or depth of a mass connection plate. In some exemplary embodiments, the MCP 300 has a thickness or depth ranging between 0.395 inches and 0.605 inches. The typical insertion depth of a connector is 0.480 inches. If the connector has an insertion depth of at least 0.350 inches, the connector would achieve a good and sufficient contact with the corresponding mating device. Therefore, the thickness of the MCP, at the point of attachment with the connector, is preferably no greater than 0.130 inches, ensuring that at least 0.350 inches remains on a standard connector for mating to a corresponding device and achieving a sufficient connection. In other embodiments, the thickness of the MCP, at the point of attachment with the connector, accounts for no more than 24-27% of the length of the insertion depth of the connector, thereby leaving 73-76% of the length of the insertion depth left for mating with the corresponding device and achieving a sufficient connection.

The MCP 300 is further configured such that a support wall or rib structured in the form of hills 303 is used to help stabilize and align the connectors after they are fitted into the desired locations. The same support wall or rib is also used when removing the connectors out of their snapped-in positions by providing a fulcrum point. In the disclosed system, the electrical connectors are coupled with the MCP 300 and subsequently the MCP 300 is coupled with a medical device without additional tools. A loaded connection plate essentially forms a singular connection mechanism and is plugged or unplugged from an associated piece of medical equipment with a unitary simple push or pull action. In embodiments, the connection plate is plugged/unplugged by grasping and pushing/pulling the outmost edges of middle planar section comprising the hills 303. Accordingly, the connectors are sufficiently attached to the MCP through a friction fit such that they do not become disconnected when the loaded connection plate is pushed into, or pulled out of, the connection ports of the medical device. The connectors are able to be removed/unsnapped manually from their corresponding location on the MCP 300 and replaced individually as required. In FIG. 3, a specific configuration of an MCP device 300 is shown; however, one of ordinary skill in the art would appreciate that the precise structure of MCP 300 can be modified in multiple ways corresponding to the size and configuration of the individual electrical connectors and the configuration of the mating device.

In embodiments, the MCP 300 comprises unique keying features which prevents the cross-wiring of various electrical connectors, such as, but not limited to recording electrodes and simulation electrodes. In embodiments, the exact dimensions of various sections or portions in the MCP 300 are customized for specific applications depending on the corresponding geometries of the electrical connectors and the receiving units.

Figure 4:
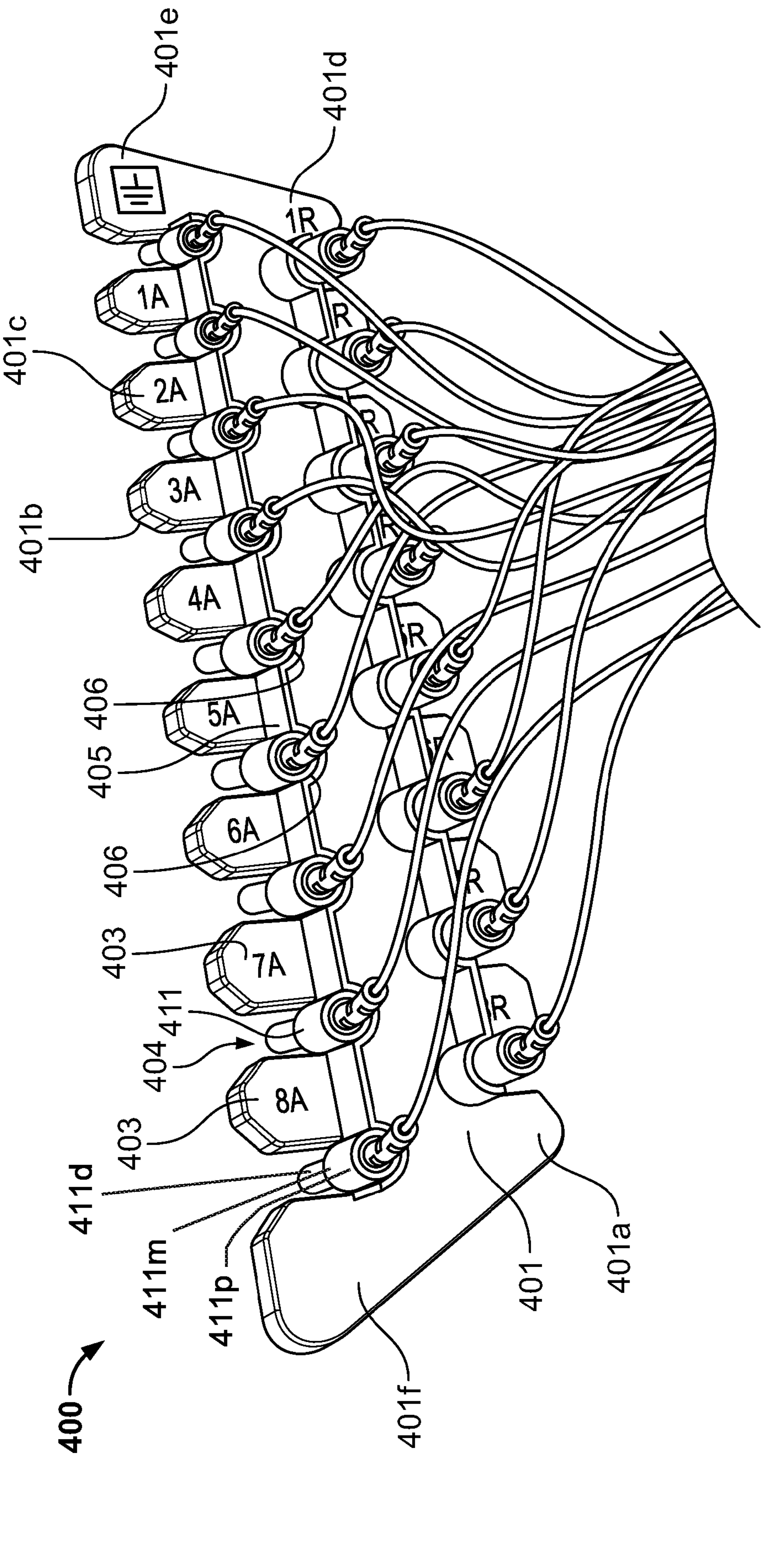
FIG. 4 is a pictorial view of an exemplary intermediate connection plate coupled to multiple electrical connectors in accordance with an embodiment of the present specification.

FIG. 4 is a pictorial view of an exemplary intermediate connection plate coupled to multiple electrical connectors in accordance with an embodiment of the present specification. As shown in FIG. 4, the intermediate connection plate or MCP 400 comprises a middle planar section 401 having a front section 401*a*, a back section 401*b*, a top edge section 401*e*, a bottom edge section 401*f*, a first side edge section 401*c* and a second side edge section 401*d*. The middle section 401 comprises a series of hills or protruding portions 403 and a series of first wells or depressed portions 404 such that there is one first well 404 positioned between two adjacent hills 403. Each first well 404 is configured to receive a middle portion 411*m* of an individual touch-proof connector 411. Proximal from the middle planar section 401 is a ledge 405 that comprises a series of u-shaped portions or second wells 406, each second well matching the position of a first well 404 in the middle planar section 401. Each second well 406 is configured to receive a proximal portion 411*p* of an individual touch-proof connector 411. Jetting outward from each first well 404 is a keyhole/receiving portion (not shown) smaller than the first well 404, which is positioned between the middle planar section 401 and the medical device and is configured to receive a distal end of the touch-proof connector 411.

The mass connection plate 400 shown in FIG. 4 is configured such that the proximal portion 411*p* of an electrical connector 411 is received in a second well 406 located in the ledge 405 and the distal end 411*d* of the electrical connector passes through the first well 404 of the middle planar section 401 and is received in one of the multiple keyholes/receiving portions (not shown in FIG. 4) positioned between the middle planar section 401 and the medical device.

Once a single connector 411 is positioned/snapped into its desired location on MCP 400 it is held there until all other connectors are also positioned into the MCP 400. The MCP 400 is configured such that support walls or ribs configured in the form hills 403 helps to stabilize and align the connectors after they are snapped into the respective channels.

In the system disclosed in FIG. 4, the electrical connectors are coupled with the MCP 400 and subsequently the MCP 400 is coupled with a medical device without additional tools. A loaded plate 400 essentially forms a singular connection mechanism and is able to be plugged or unplugged from the associated piece of medical equipment with a single push or pull action. The connectors are able to be removed/unsnapped manually from their corresponding location on the MCP 400 and replaced individually as required.

Figure 5A:
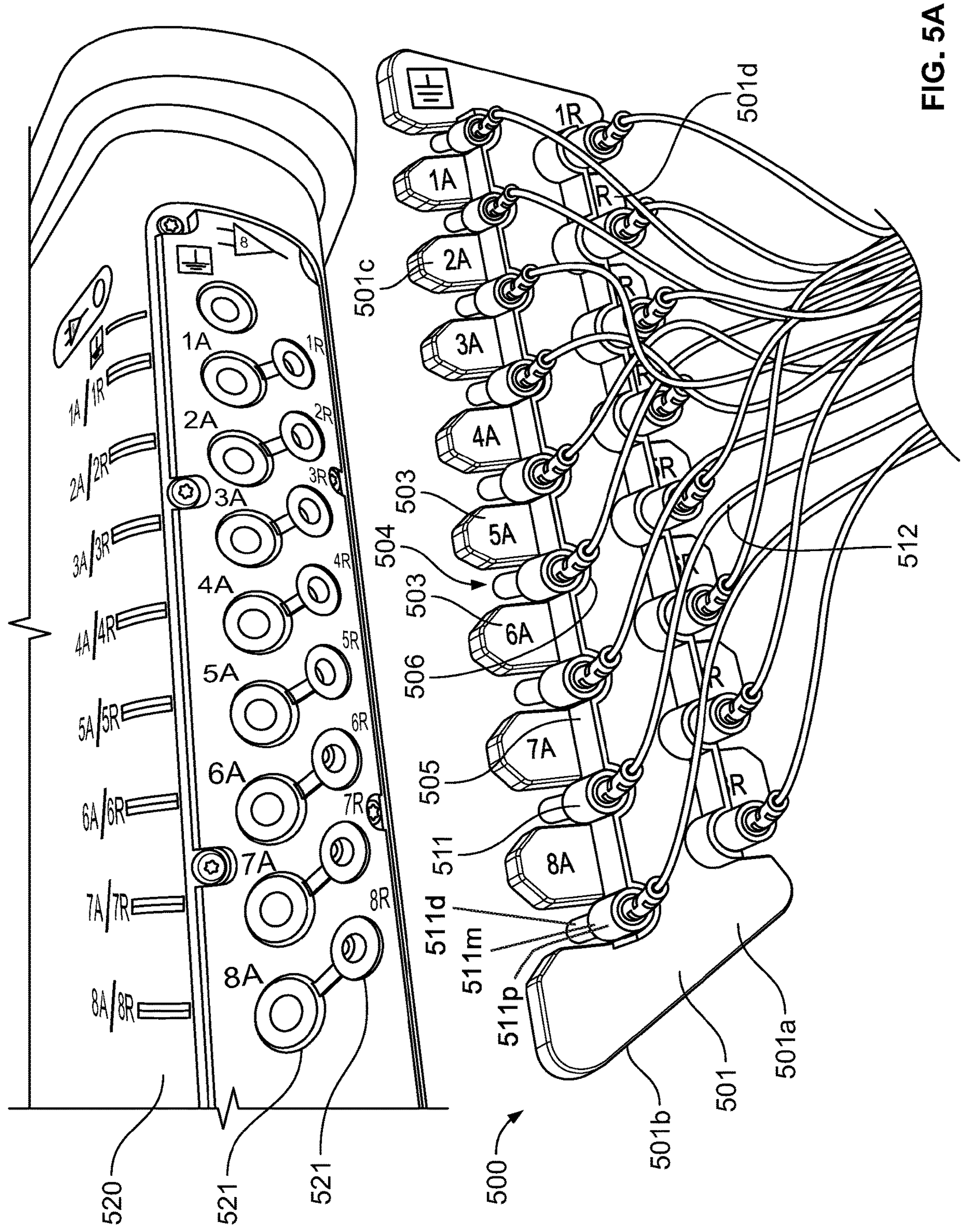
FIG. 5A depicts the use of a loaded exemplary intermediate connection plate ready for insertion into receiving sockets located within a medical device in accordance with an embodiment of the present specification.

FIG. 5A depicts a loaded exemplary intermediate connection plate ready for insertion into the receiving sockets located within a medical device in accordance with an embodiment of the present specification. As shown in FIG. 5A, the intermediate connection plate or MCP 500 comprises a middle planar section 501 having a front section 501*a*, a back section 501*b*, a first side edge section 501*c* and a second side edge section 501*d*. The middle section 501 comprises a series of hills 503 and first wells 504 such that there is one first well 504 between two adjacent hills 503 and each first well 504 is configured to receive a middle portion 511*m* of the touch-proof connector 511. Proximal from the middle planar section 501 is a ledge 505 that comprises a series of u-shaped portions or second wells 506, each second well 506 matching the position of a first well 504 in the middle planar section 501. Each second well 506 is configured to receive a proximal portion 511*p* of an individual touch-proof connector 511. Jetting outward from each first well 504 is a keyhole/receiving portion (not shown) smaller than the valley 504, which is positioned between the middle planar section 501 and the medical device 520 and is configured to receive a distal portion 511*d* of the touch-proof connector 511.

The mass connection plate 500 shown in FIG. 5A is configured such that the proximal section 511*p* of an electrical connector 511 which is coupled with an electrical wire 512 is received in a second well 506 located in the ledge 505 and the distal portion 511*d* of the electrical connector 511 passes through a first well 504 of the middle planar section 501 and is received in a corresponding keyhole/receiving section located on back side of the plate positioned between the middle planar section 501 and the medical device 520. Each matching combination of a second well 506, a first well 504 and a keyhole/receiving section located on the back side of the plate together comprise one single channel in the MCP 300 in which one electrical connector can be fitted.

The various keyholes/receiving sections located on the back side of the MCP 500 are configured to receive the distal portions 511*d* of respective electrical connectors 511 and provide support to hold the electrical connectors firmly in their position.

As shown in FIG. 5A, the MCP 500 is coupled with multiple electrical connectors 511 which are firm in their position. The various electrical connectors 511 are self-supported in their position by the unique and novel structure of the MCP 500 disclosed in this specification. The novel configuration comprising a series of hill shaped sections 503 does not allow any sideways movement of the electrical connectors 511. Further, the unique well shaped second wells 506 which host the proximal portion 511*p* of electrical connectors 511 discourage any vertical movement of the connectors. The keyholes/receiving sections present on the back side of MCP 500, which host the distal portion 511*d* of the connectors 511, act as hooks and prevent any movement of the connectors. The loaded plate 500 is shown ready to be coupled with the medical device 520 shown in FIG. 5A. A loaded plate 500 essentially works on a one-connection mechanism and is able to be plugged or unplugged from the medical equipment 520 with a simple push or pull action respectively. In the disclosed embodiment, the medical device 520 can be any kind of instrument or device used in medical systems. In neuro-monitoring applications such as EEG, the device 520 is a control unit or amplifier in an embodiment. The control device 520 comprises a plurality of receiving or mating sockets 521 which are configured to receive the distal portions 511*d* of connectors 511 and establish an electrical connection.

Figure 5B:
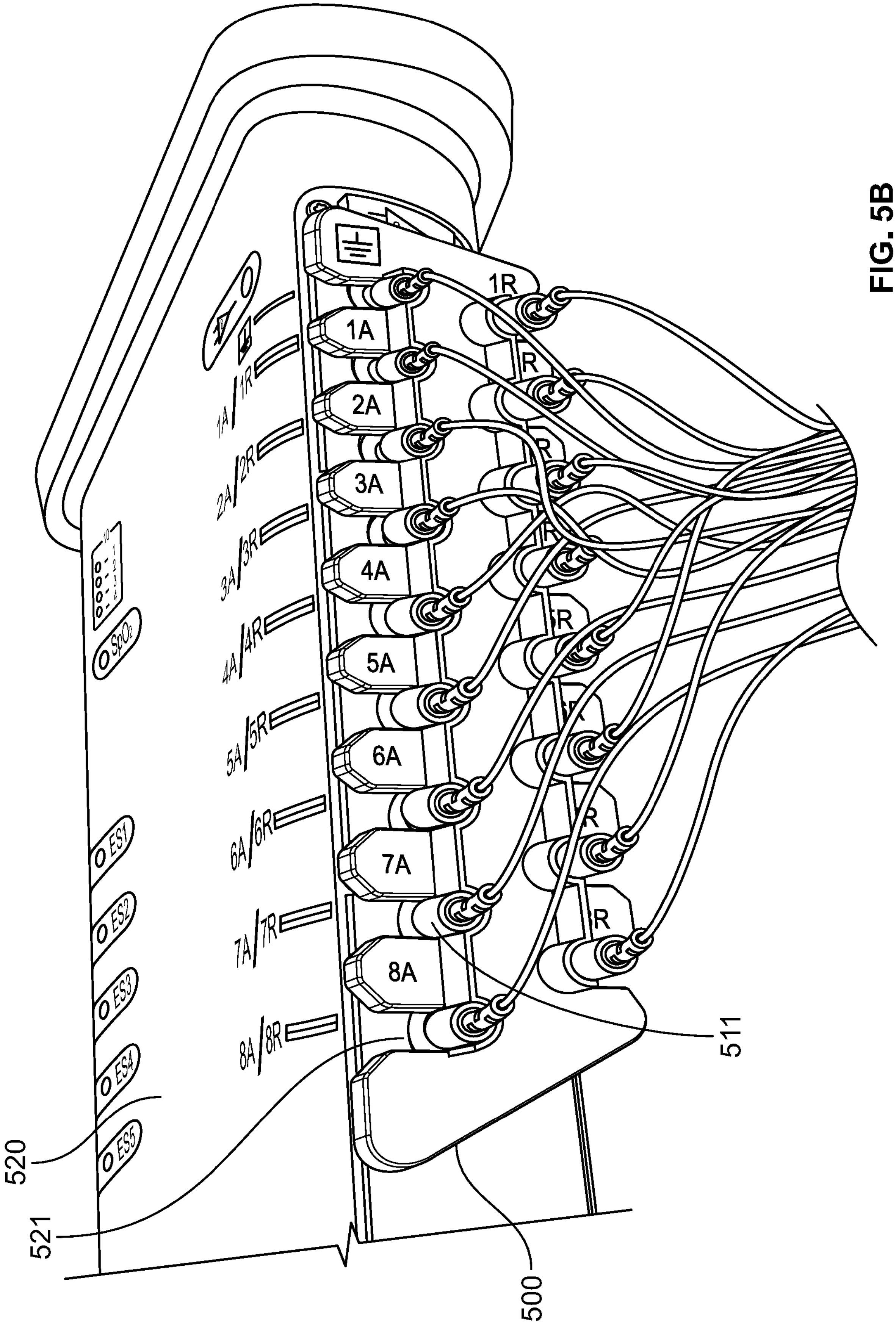
FIG. 5B depicts the use of an intermediate connection plate when fully positioned into receiving sockets located within a medical device in accordance with an embodiment of the present specification.

FIG. 5B depicts an intermediate connection plate fully positioned into the receiving units located within a medical device in accordance with an embodiment of the present specification. As shown in FIG. 5B, the MCP 500 is coupled with the control device 520 such that the distal portion of various electrical connectors 511 is received in the corresponding receiving sockets 521. The connectors 511 are firmly positioned in their respective channels or slots. The MCP 500 comprises a unique structure as described in the above embodiments which helps to stabilize and align the connectors after they are snapped into respective slots or channels. The same structure also supports removing the connectors out of their snapped-in positions by providing a fulcrum point. In embodiments, a connector 511 is removed through application of force to the bottom of the connector from the center of MCP 500 towards the outer edge of MCP 500.

Figure 5C:
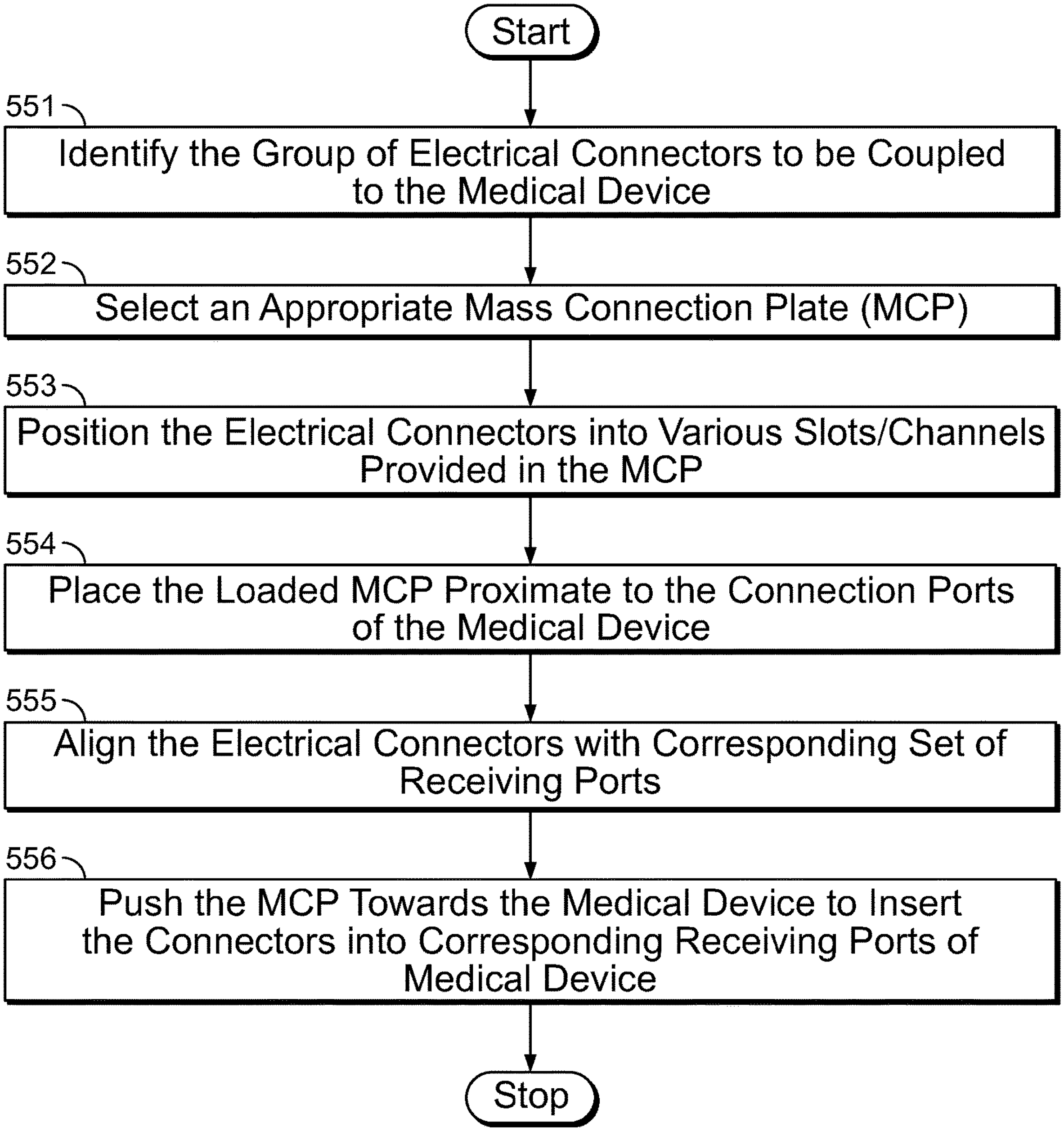
FIG. 5C is a flowchart illustrating the steps involved for connecting a group of electrical connectors with the connection ports of a medical device using the connection plate or MCP of the present specification.

In an embodiment, the present specification describes a method for connecting a group of electrical connectors with the connection ports of a medical device using the connection plate or mass connection plate of the present specification. Referring now to FIG. 5C, which is a flowchart illustrating the connection steps, at step 551, the clinician or the care provider identifies and selects a group of electrical connectors which are to be coupled with the corresponding connection ports of a medical device. At step 552, the clinician selects an appropriate MCP which can be used to couple the selected electrical connectors as a single group with the medical device.

Typically, as the connection plates or the MCPs are customized for specific medical applications and their sizes, shapes and other dimensions may vary depending on the corresponding sizes and shapes of medical connectors and connection ports being used in that specific medical application. Further, the MCPs can have different capacities depending on the number of electrical connectors that can fit into the various channels or grooves located in an MCP. The clinician selects an appropriate MCP depending on the type of electrical connectors and the medical device involved in the application and the number of electrical connectors to be coupled using the MCP. In some embodiments, the clinician may use multiple MCPs of same or different capacities to engage a large number of connectors with the corresponding connection ports of a medical device.

In embodiments, the MCP of the present specification comprises a middle planar section further comprising a plurality of protruding portions extending outward from at least one of the edge sections of the middle planar section wherein each protruding portion of the plurality of protruding portions is separated from an adjacent protruding portion of the plurality of protruding portions by a space and wherein each space is adapted to receive a middle portion of an electrical connector. Further, in embodiments, the MCP comprises a proximal portion coupled to the middle planar section and extending outward in a first direction that is substantially perpendicular to the plurality of protruding portions, wherein the proximal section comprises a first plurality of receiving areas adapted to receive a proximal portion of an electrical connector. Further, in embodiments, the MCP comprises a distal portion coupled to the middle planar section and extending outward in a second direction that is substantially perpendicular to the plurality of protruding portions and in opposition to the first direction, wherein the distal portion comprises a second plurality of receiving areas adapted to receive a distal portion of an electrical connector.

At step 553, the electrical connectors are positioned into the various slots/grooves provided in the MCP. In embodiments, in step 553, the electrical connectors are positioned so that a distal end of each individual electrical connector is positioned onto one of the receiving areas in the distal section of the MCP, a middle portion of each individual electrical is positioned onto one of the spaces in the middle planar section of the MCP and a proximal portion of each individual electrical connector is positioned onto one of the receiving areas in the proximal portion of the MCP.

At step 554, a loaded MCP comprising a group of electrical connector positioned into its channels/grooves is placed near the connection ports of the medical device. At step 555, the positioning of the MCP is fine tuned so that each electrical connector is aligned to a corresponding receiving port in the medical device. At step 556, the MCP is pushed towards the medical device to insert the connectors engaged with the MCP into the corresponding receiving ports of the medical device. Once the connectors are sufficiently inserted into the receiving ports of the medical device, an electrical connection is established between the electrical connectors and the medical device and the system is ready for operation.

As described above, a complete group of electrical connectors are inserted into a medical device with a single push action by using the mass connection plate of the present specification.

Figure 6A:
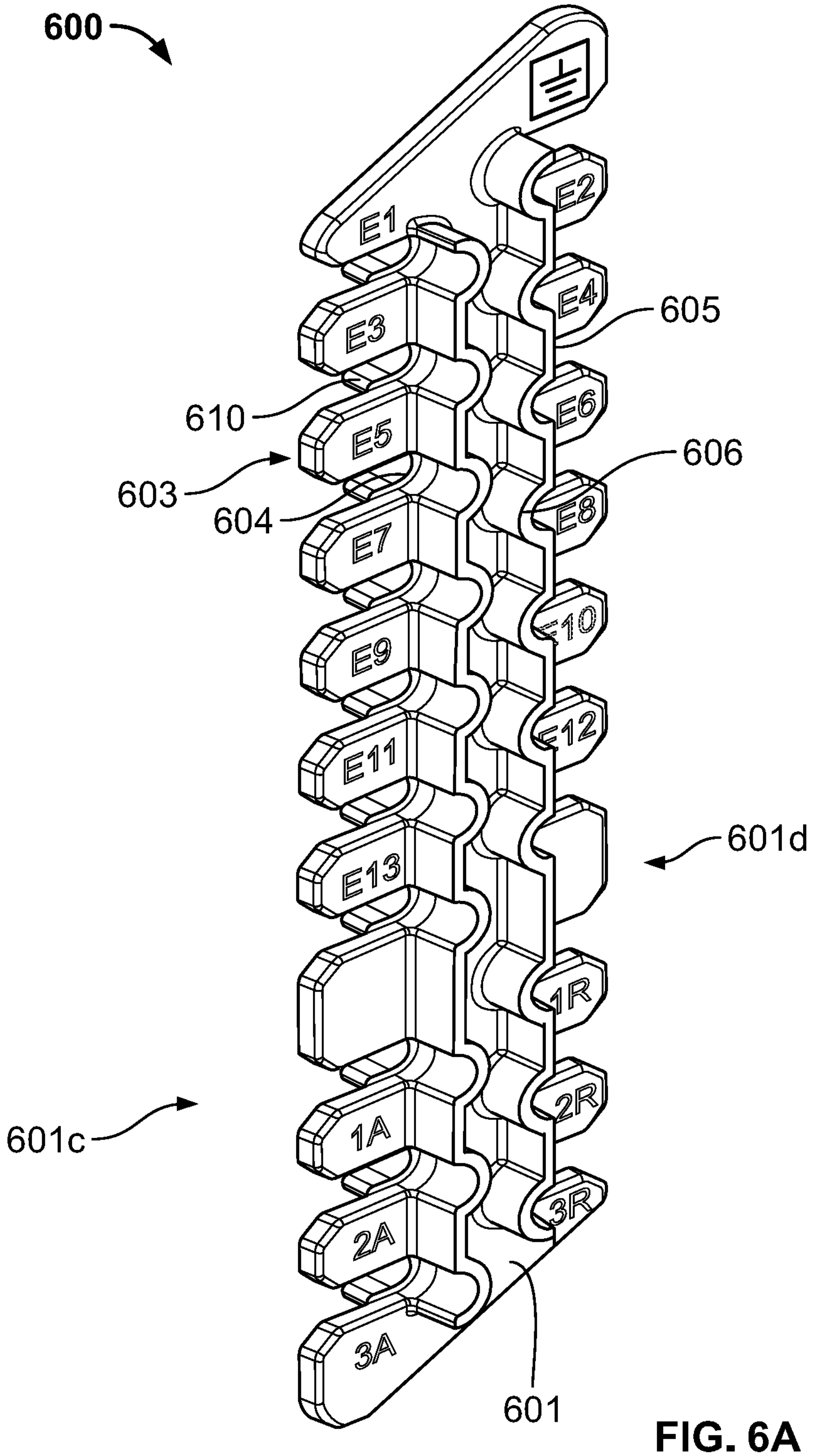
FIG. 6A is a perspective view of an exemplary mass connection plate in accordance with an embodiment of the present specification.

FIG. 6A is a perspective view of an exemplary mass connection plate in accordance with an embodiment of the present specification. The mass connection plate 600 comprises, in one embodiment, twenty channels or grooves that are configured to receive and hold the electrical connectors. It should be understood by those of ordinary skill in the art that the mass connection plate may be configured to house any number of channels or grooves to achieve the objectives of the present specification. In the middle of the mass connection plate 600 is a large, primary planar surface 601 that comprises a series of hills 603 and valleys 604, each valley being configured to receive a middle portion of a touch-proof connector. The middle planar section 601 comprises the series of hills 603 and valleys 604 positioned along a first side edge section 601*c* and a second side edge section 601*d*. Proximal from the middle planar section 601 is a ledge 605 that comprises a series of u-shaped portions or wells 606, each well matching the position of a valley 604 in the middle planar section 601. Each well 606 is configured to receive a proximal portion of an individual touch-proof connector. Jetting outward from each valley 604 is a keyhole or receiving section 610, smaller than the valley 604, and positioned between the middle planar section 601 and a medical device. Each keyhole/receiving section 610 is configured to receive a distal end of the touch-proof connector.

Figure 6B:
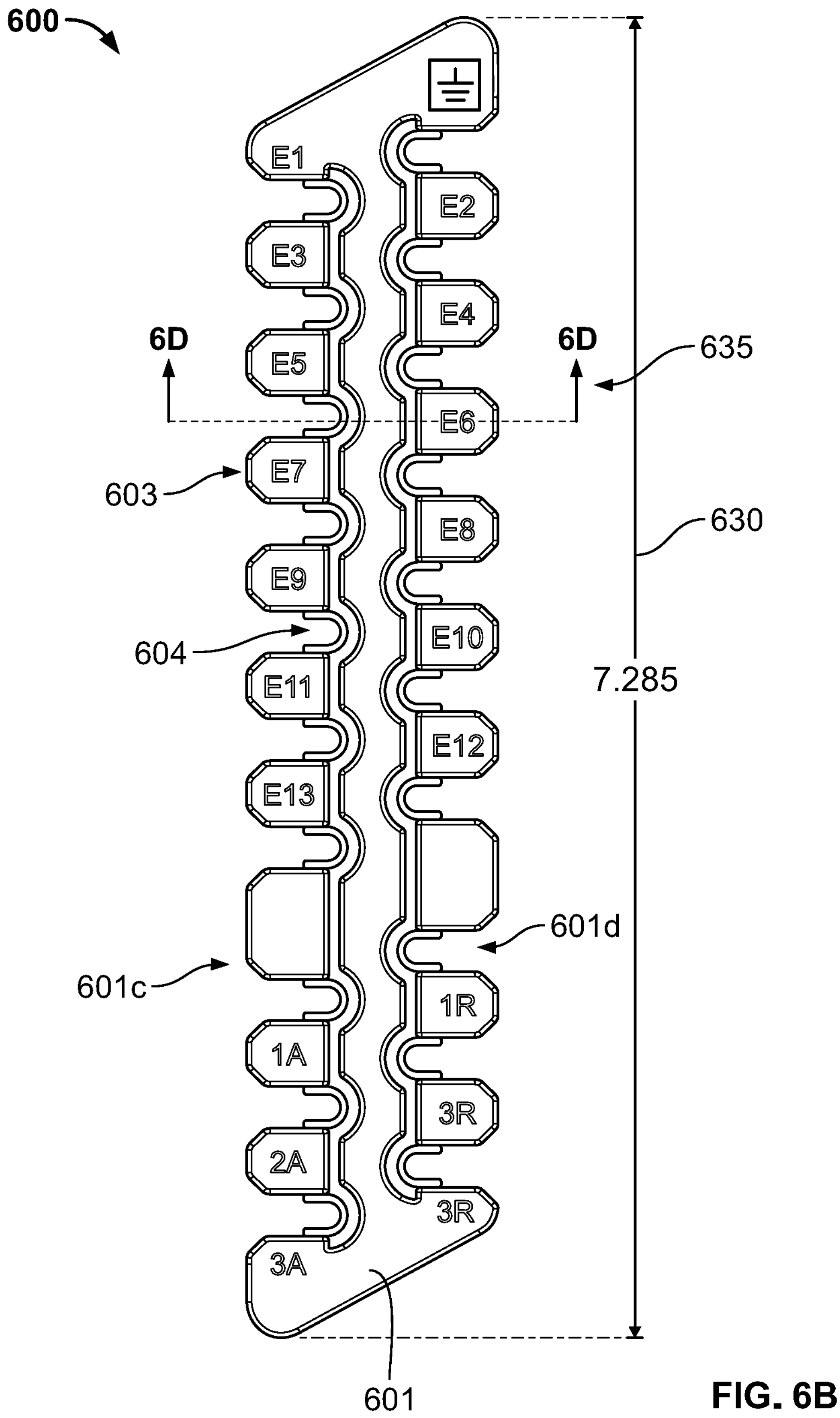
FIG. 6B is a front elevation view of the mass connection plate shown in FIG. 6A in accordance with an embodiment of the present specification.

FIG. 6B is a front elevation view of the mass connection plate shown in FIG. 6A in accordance with an embodiment of the present specification. As shown in FIG. 6B, MCP 600 comprises ten channel/valleys 604 carved into each of the first side edge section 601*c* and the second side edge section 601*d*. The length 630 of middle planar section 601 is equal to 7.285 inches in the exemplary embodiment shown in FIG. 6B.

Figure 6C:
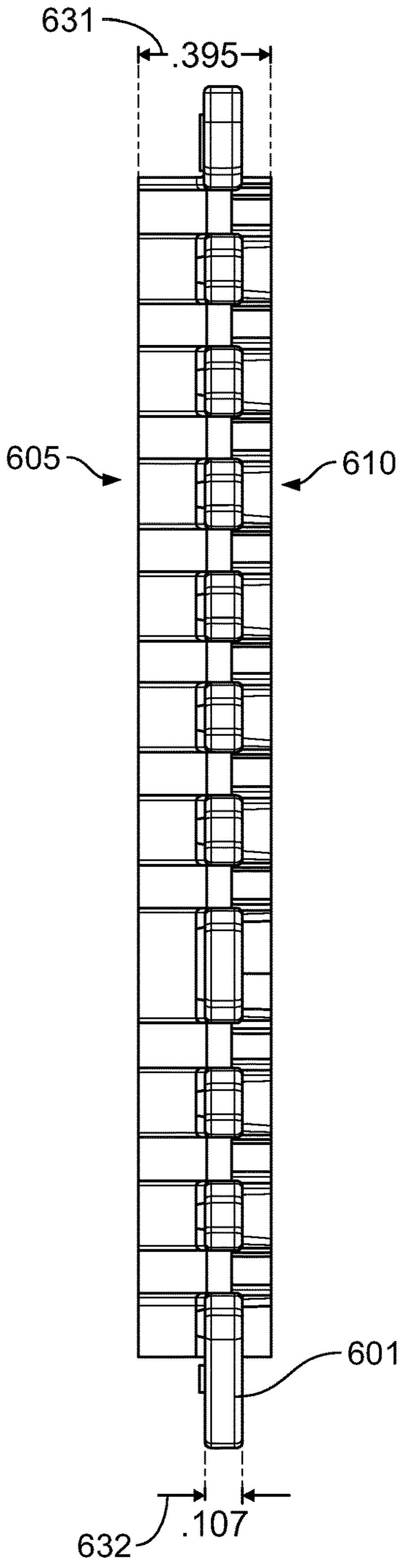
FIG. 6C is a side elevation view of the mass connection plate shown in FIG. 6A in accordance with an embodiment of the present specification.

FIG. 6C is a side elevation view of the mass connection plate shown in FIG. 6A in accordance with an embodiment of the present specification. The thickness 631 of MCP 600 is equal to 0.395 inches and the thickness 632 of middle planar section 601 is equal to 0.107 inches in the exemplary embodiment shown in FIG. 6C.

Figure 6D:
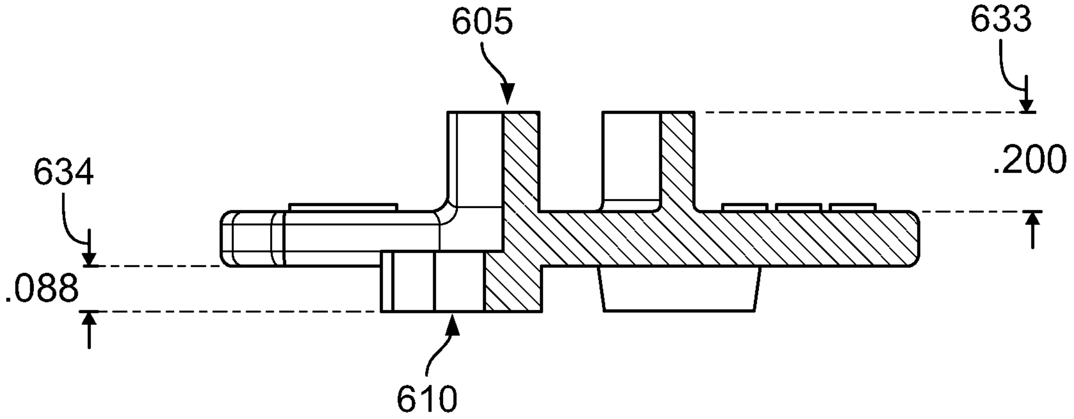
FIG. 6D is a sectional view of the mass connection plate shown in FIG. 6A in accordance with an embodiment of the present specification.

FIG. 6D is a sectional view of the mass connection plate shown in FIG. 6A in accordance with an embodiment of the present specification. As shown in FIG. 6D, the thickness 633 of proximal section 605 is equal to 0.200 inches and the thickness 634 of distal section 610 is equal to 0.088 inches in the above exemplary embodiment.

Figure 6E:
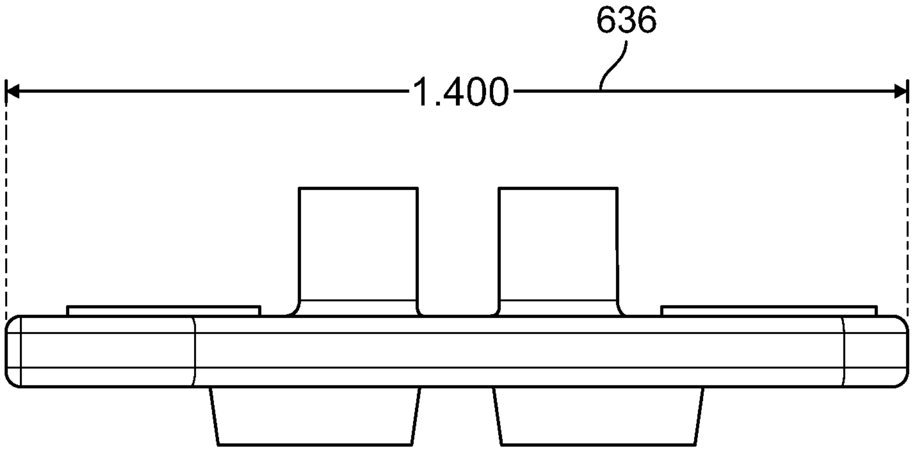
FIG. 6E is a top plan view of the mass connection plate shown in FIG. 6A in accordance with an embodiment of the present specification.

FIG. 6E is a top plan view of the mass connection plate shown in FIG. 6A in accordance with an embodiment of the present specification. As shown in FIG. 6E, the width 636 of MCP 600 is equal to 1.4 inches in an embodiment.

Figure 7A:
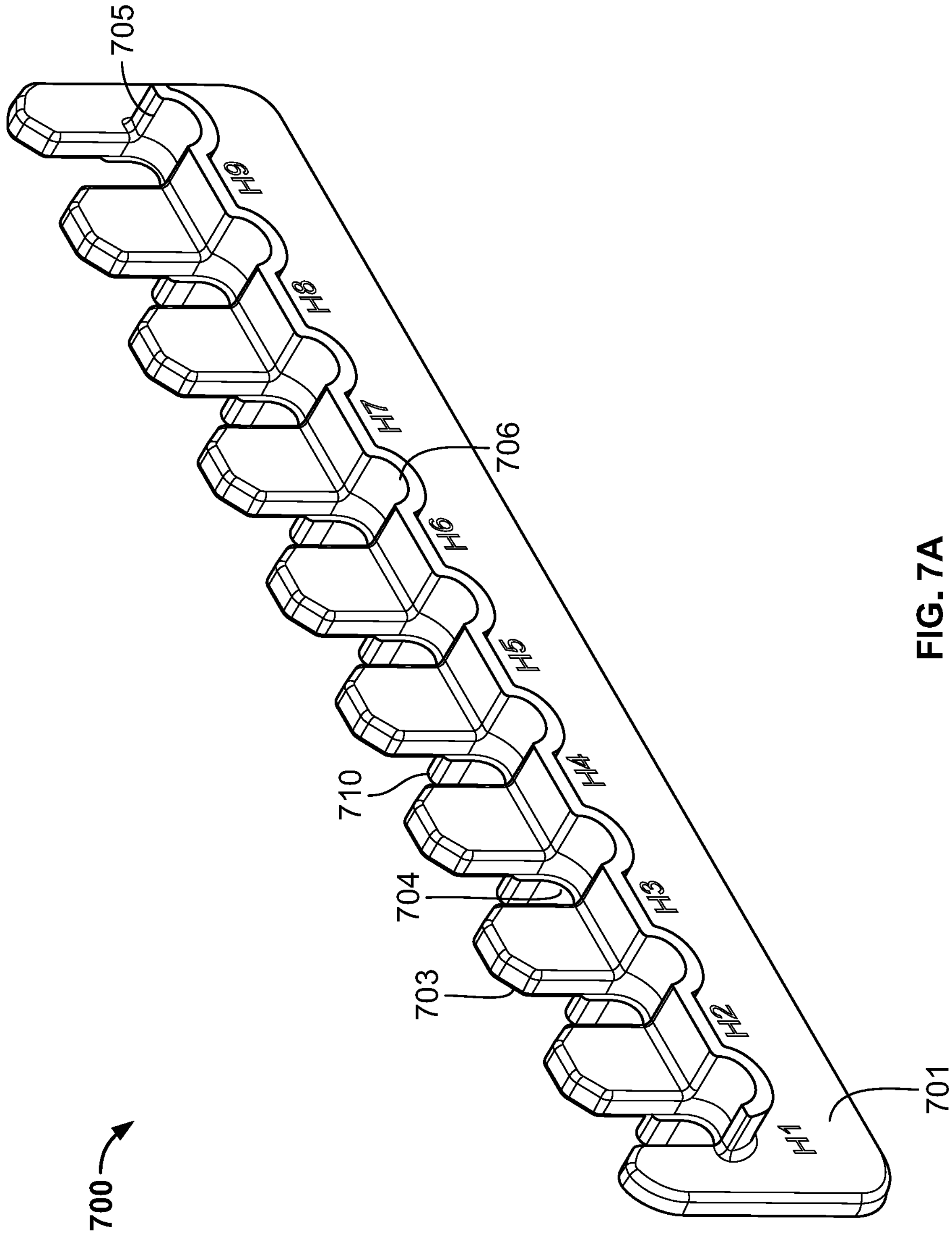
FIG. 7A is a perspective view of another exemplary mass connection plate in accordance with an embodiment of the present specification.

FIG. 7A is a perspective view of another exemplary mass connection plate in accordance with an embodiment of the present specification. The mass connection plate 700 comprises nine channels or grooves that are configured to receive and hold the electrical connectors. In the middle of the mass connection plate 700 is the large, primary planar surface 701 that comprises a series of hills 703 and valleys 704, each valley being configured to receive a middle portion of the touch-proof connector. The middle planar section 701 comprises the series of hills 703 and valleys 704 along one of its side edge sections. Proximal from the middle planar section 701 is a ledge 705 that comprises a series of u-shaped portions or wells 706, each well matching the position of a valley 704 in the middle planar section 701. Each well 706 is configured to receive a proximal portion of an individual touch-proof connector. Jetting outward from each valley 704 is a keyhole or receiving section 710, smaller than the valley 704, and positioned between the middle planar section 701 and a medical device. Each keyhole/receiving section 710 is configured to receive a distal end of the touch-proof connector.

Figure 7B:
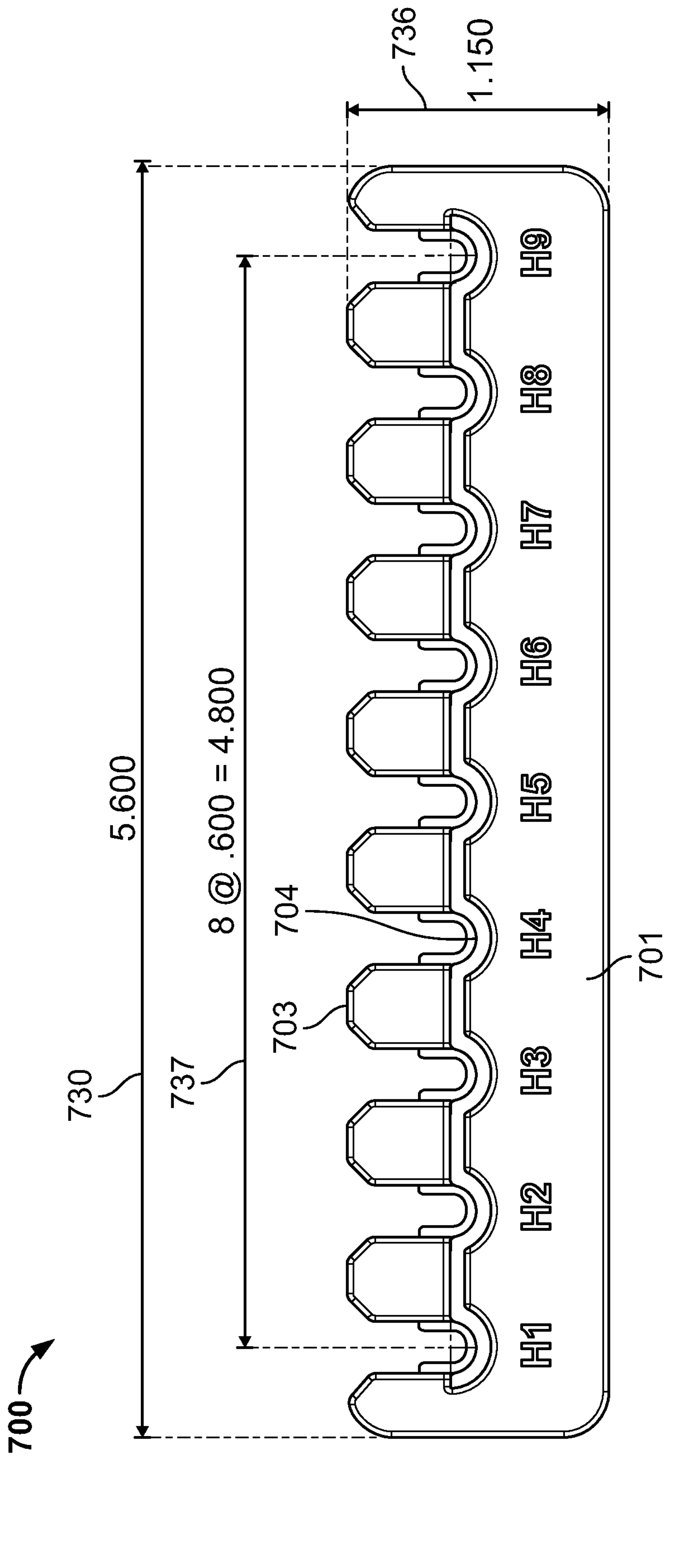
FIG. 7B is a front elevation view of the mass connection plate shown in FIG. 7A in accordance with an embodiment of the present specification.

FIG. 7B is a front elevation view of the mass connection plate shown in FIG. 7A in accordance with an embodiment of the present specification. As shown in FIG. 7B, MCP 700 comprises nine channels or valleys 704 carved into one of its side edge section. In the above exemplary embodiment, the distance between the centers of two adjacent valleys 704 is equal to 0.6 inches and accordingly the total distance 737 from the center of first valley to the center of ninth valley is equal to 4.80 inches. The full length 730 and the width 736 of middle planar section 701 are equal to 5.60 inches and 1.15 inches respectively in the above exemplary embodiment.

Figure 7C:
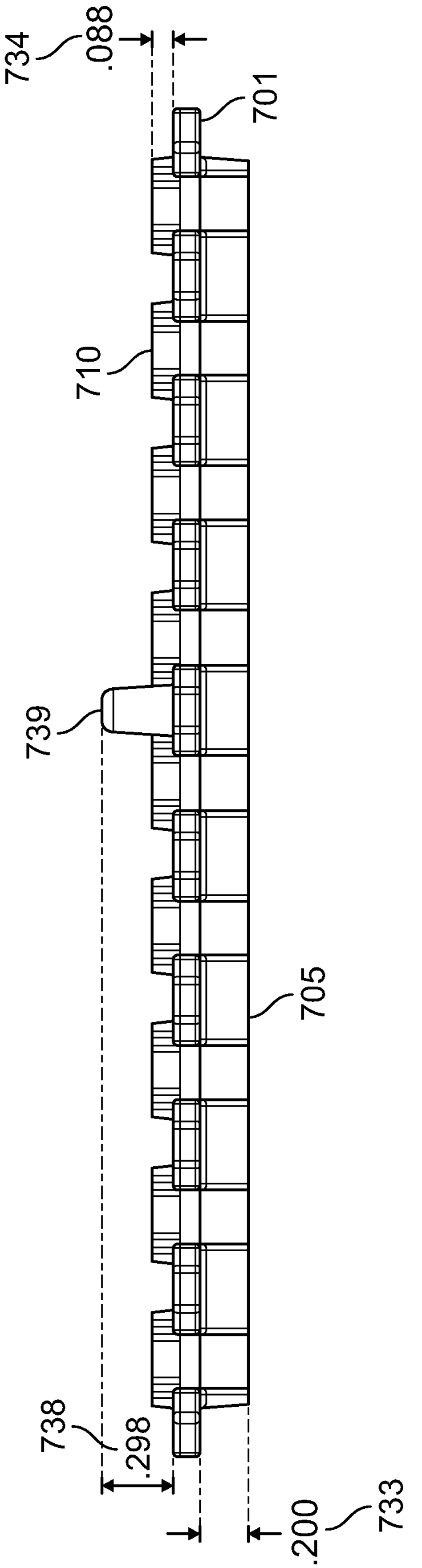
FIG. 7C is a side elevation view of the mass connection plate shown in FIG. 7A in accordance with an embodiment of the present specification.

FIG. 7C is a top plan view of the mass connection plate shown in FIG. 7A in accordance with an embodiment of the present specification. As shown in FIG. 7C, the thickness 733 of proximal section 705 is equal to 0.20 inches and the thickness 734 of keyhole/receiving section 710 is equal to 0.88 inches in an exemplary embodiment. FIG. 7C depicts a protruding portion 739 which acts as a keying element and prevents any incorrect mating between MCP and medical device. In embodiments, the protruding portion 739 present on MCP 700 is offset from the centerline of the MCP and is configured to enter into a corresponding mating void present on the medical device when the MCP is connected in a correct orientation. In embodiments, the MCP can be engaged with the device in only one specific orientation. In other orientations, the MCP cannot engage with the medical device as the mating void on the medical device would not be aligned to receive the protruding portion 739.

In some embodiments, because the MCP 700 has a symmetrical design, it would be possible to rotate the MCP 700 by 180 degrees and still plug it in the medical device leading to an incorrect connection. Therefore, in some embodiments, the presence of protruding portion 739 prevents any incorrect mating between MCP and medical device. The mass connection plates that are not symmetrical in design do not require a protrusion or protruding portion 739 as these plates will not connect/mate with device in an incorrect orientation.

In an embodiment, the thickness 738 of protruding portion 739 is equal to 0.298 inches.

Figure 7D:
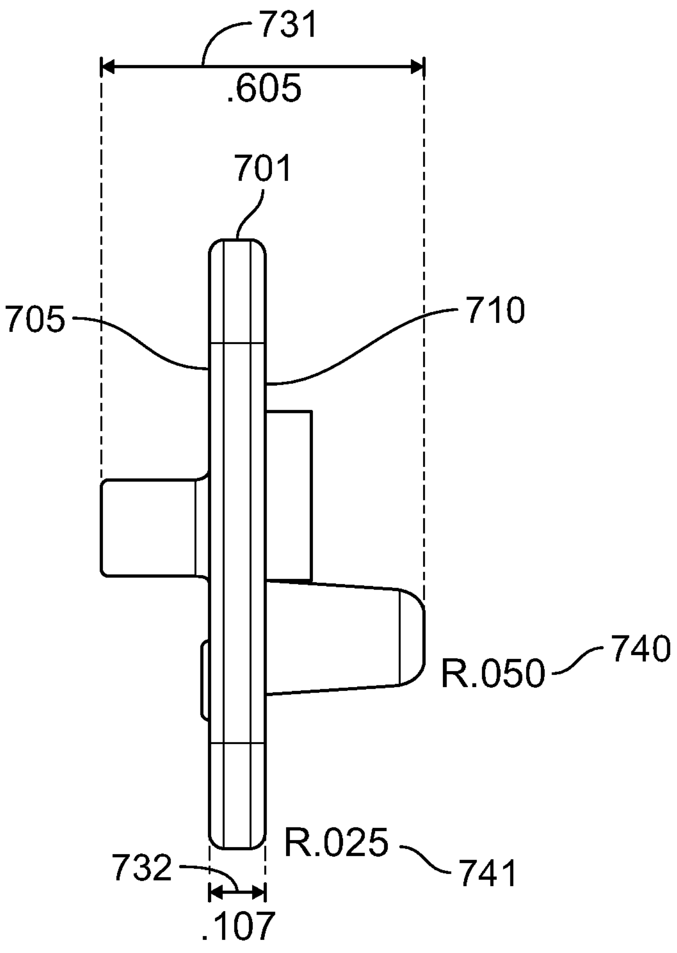
FIG. 7D is a top plan view of the mass connection plate shown in FIG. 7A in accordance with an embodiment of the present specification.

FIG. 7D is a side elevation view of the mass connection plate shown in FIG. 7A in accordance with an embodiment of the present specification. In FIG. 7D, the thickness 731 of the MCP 700 and the thickness 732 of middle planar section 701 are equal to 0.605 inches and 0.107 inches, respectively, in an exemplary embodiment. The radius 740 of a filleted edge of element 739 and the radius 741 of a filleted edge of middle planar section 701 as depicted in FIG. 7D are equal to 0.050 inches and 0.025 inches respectively, in an exemplary embodiment.

Figure 8A:
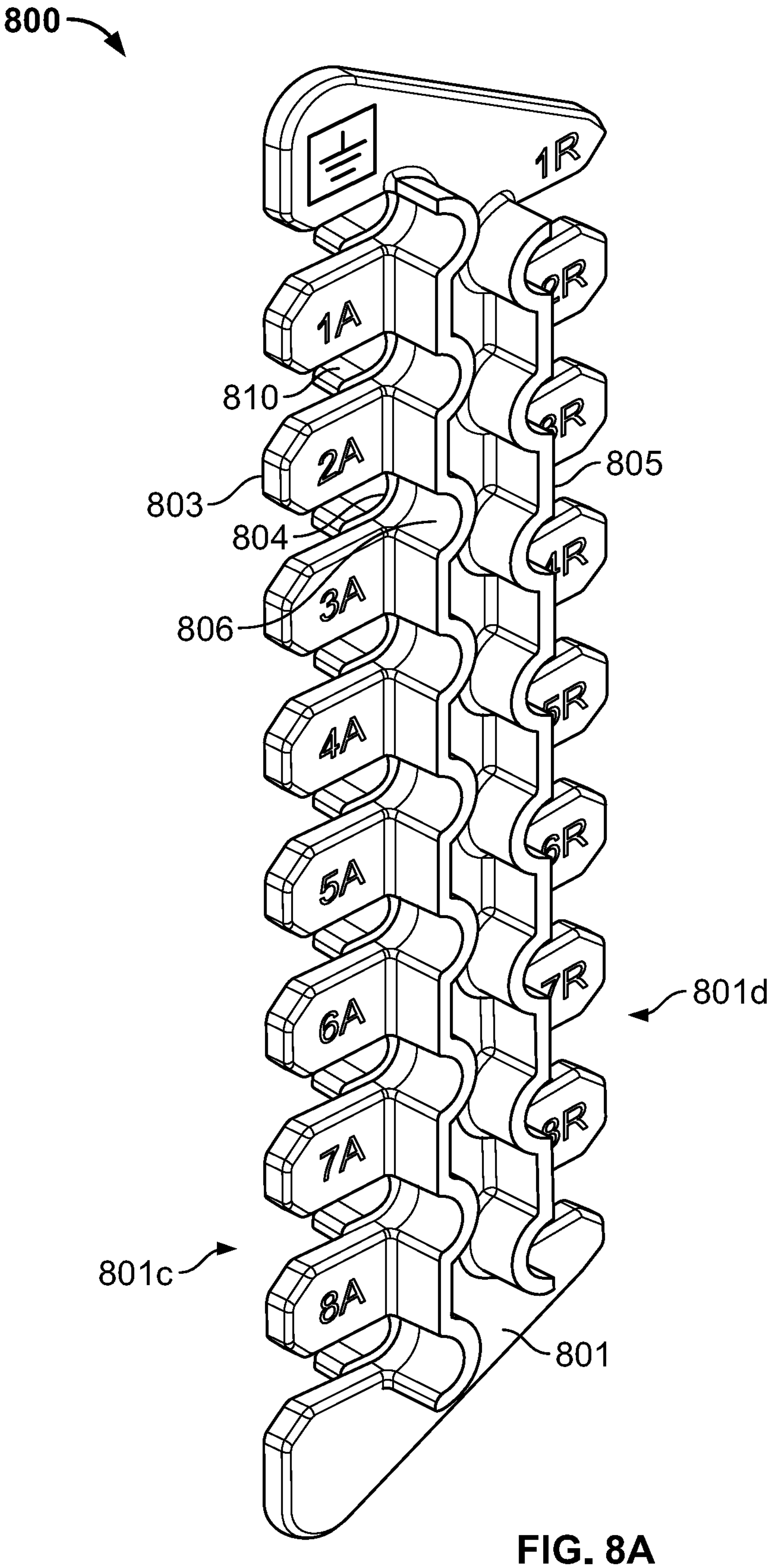
FIG. 8A is a perspective view of another exemplary mass connection plate in accordance with an embodiment of the present specification.

FIG. 8A is a perspective view of another exemplary mass connection plate in accordance with an embodiment of the present specification. The mass connection plate 800 comprises seventeen channels or grooves that are configured to receive and hold the electrical connectors. In the middle of the mass connection plate 800 is the large, primary planar surface 801 that comprises a series of hills 803 and valleys 804, each valley being configured to receive a middle portion of the touch-proof connector. The middle planar section 801 comprises the series of hills 803 and valleys 804 along a first side edge section 801*c* and a second side edge section 801*d*. Proximal from the middle planar section 801 is a ledge 805 that comprises a series of u-shaped portions or wells 806, each well matching the position of a valley 804 in the middle planar section 801. Each well 806 is configured to receive a proximal portion of an individual touch-proof connector. Jetting outward from each valley 804 is a keyhole or receiving section 810, smaller than the valley 804, and positioned between the middle planar section 801 and a medical device. Each keyholes/receiving section 810 is configured to receive a distal end of the touch-proof connector.

Figure 8B:
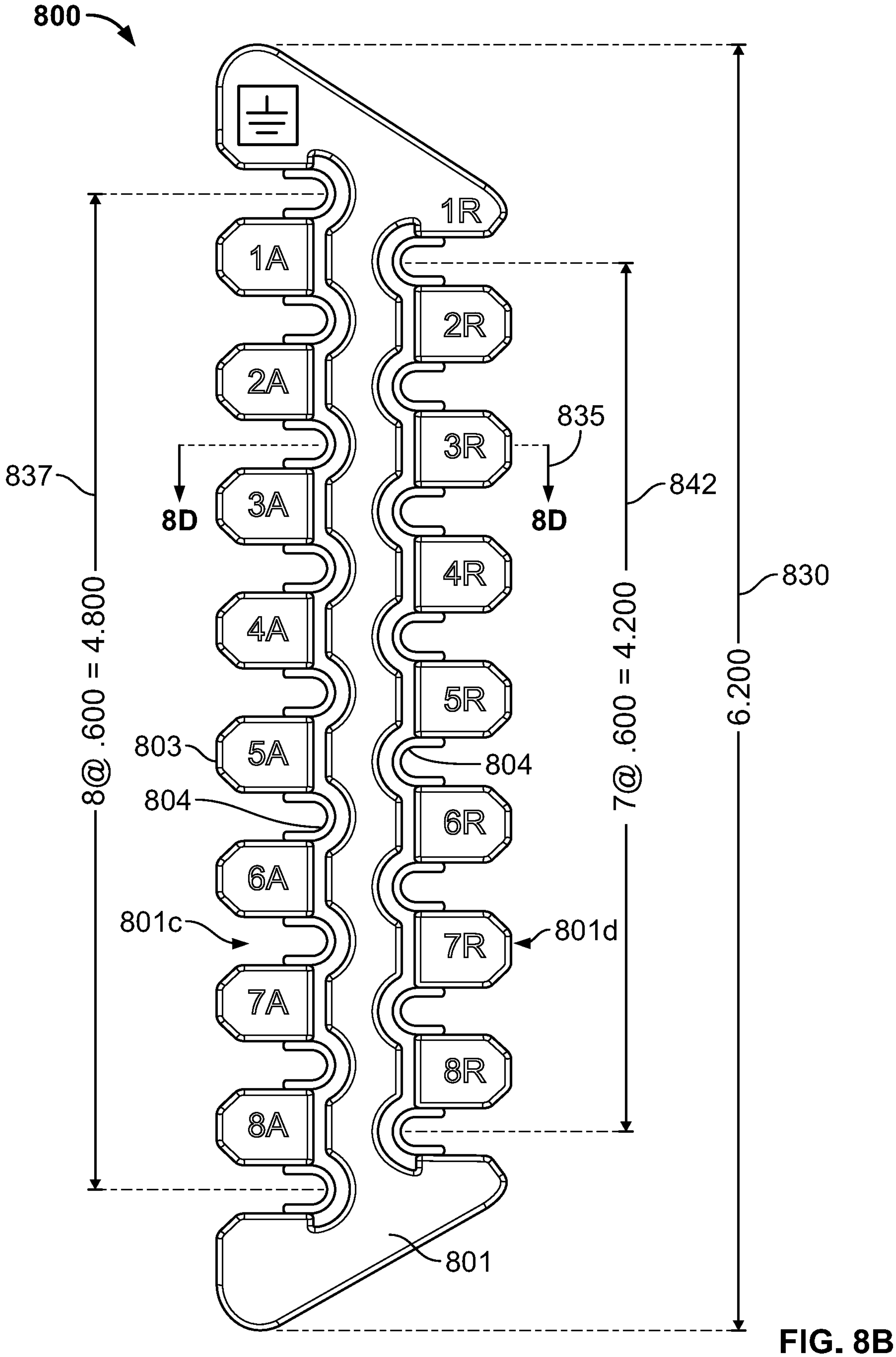
FIG. 8B is a front elevation view of the mass connection plate shown in FIG. 8A in accordance with an embodiment of the present specification.

FIG. 8B is a front elevation view of the mass connection plate shown in FIG. 8A in accordance with an embodiment of the present specification. As shown in FIG. 8B, MCP 800 comprises nine channels or valleys 804 carved into a first side edge section 801*c* and eight channels or valleys 804 carved into a second side edge section 801*d*. In above exemplary embodiment, the distance between the centers of two adjacent valleys 804 is equal to 0.6 inches and accordingly the distance 837 from the center of first valley to the center of ninth valley on the first side edge section 801*c* is equal to 4.80 inches. The distance 842 from the center of first valley to the center of eighth valley on the second side edge section 801*d* is equal to 4.20 inches. The full length 830 of middle planar section 801 is equal to 6.20 inches in an exemplary embodiment shown in FIG. 8B.

Figure 8C:
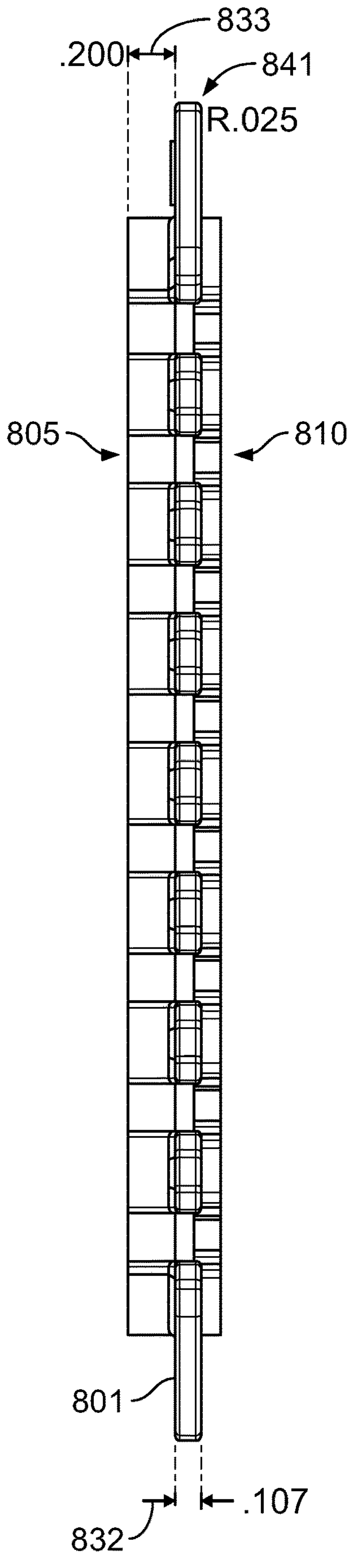
FIG. 8C is a side elevation view of the mass connection plate shown in FIG. 8A in accordance with an embodiment of the present specification.

FIG. 8C is a side elevation view of the mass connection plate shown in FIG. 8A in accordance with an embodiment of the present specification. As shown in FIG. 8C, the thickness 833 of proximal section 805 and the thickness 832 of middle planar section 801 are equal to 0.20 inches and 0.107 inches respectively in an exemplary embodiment. The radius 841 of a filleted edge of middle planar section 801 as depicted in FIG. 8C is equal to 0.025 inches in an embodiment.

Figure 8D:
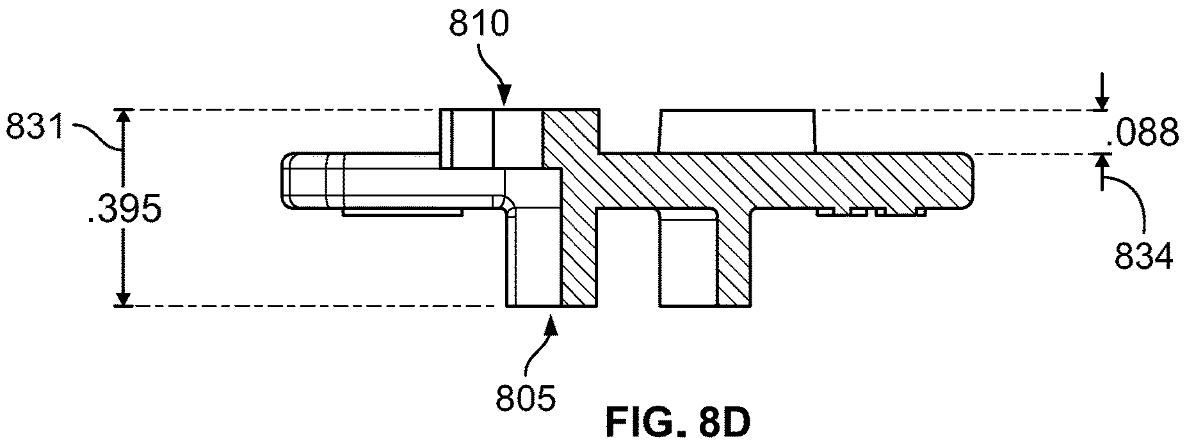
FIG. 8D is a sectional view of the mass connection plate shown in FIG. 8A in accordance with an embodiment of the present specification.

FIG. 8D is a sectional view of the mass connection plate shown in FIG. 8A in accordance with an embodiment of the present specification. As shown in FIG. 8D, the thickness 831 of MCP 800 is equal to 0.395 inches in an embodiment. The thickness 834 of distal section 810 is equal to 0.088 inches in the same exemplary embodiment shown in FIG. 8D.

Figure 8E:
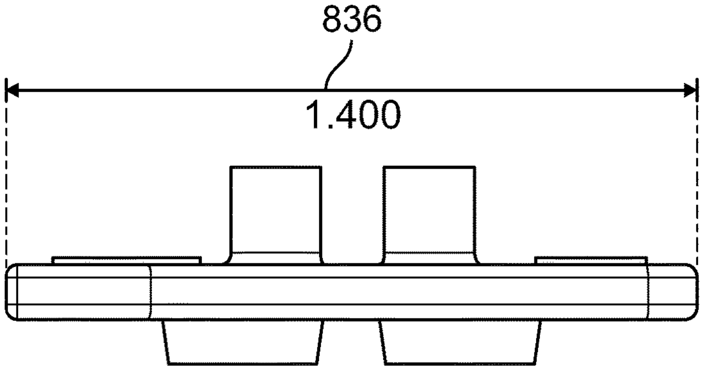
FIG. 8E is a bottom plan view of the mass connection plate shown in FIG. 8A in accordance with an embodiment of the present specification.

FIG. 8E is a bottom plan view of the mass connection plates shown in FIG. 8A in accordance with an embodiment of the present specification. As shown in FIG. 8E, the width 836 of MCP 800 is equal to 1.4 inches in an embodiment.

Figure 9A:
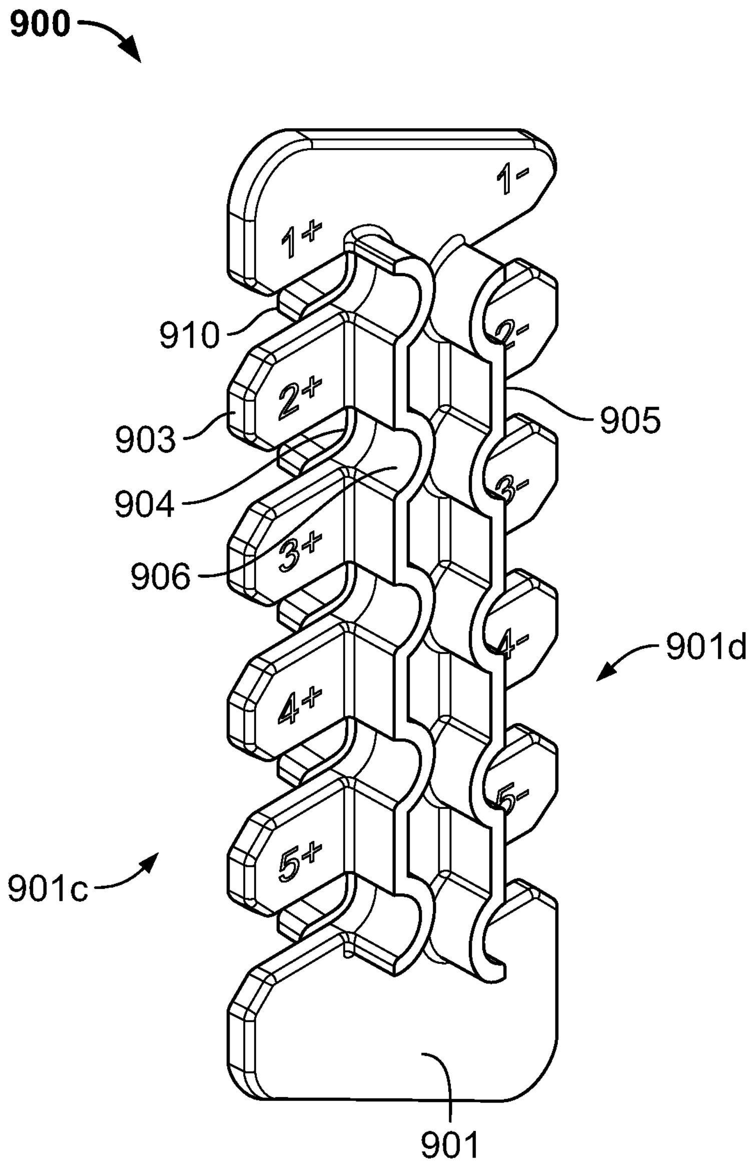
FIG. 9A is a perspective view of another exemplary mass connection plate in accordance with an embodiment of the present specification.

FIG. 9A is a perspective view of another exemplary mass connection plate in accordance with an embodiment of the present specification. The mass connection plate 900 comprises ten channels or grooves that are configured to receive and hold the electrical connectors. In the middle of the mass connection plate 900 is the large, primary planar surface 901 that comprises a series of hills 903 and valleys 904, each valley being configured to receive a middle portion of a touch-proof connector. The middle planar section 901 comprises the series of hills 903 and valleys 904 along a first side edge section 901*c* and a second side edge section 901*d*. Proximal from the middle planar section 901 is a ledge 905 that comprises a series of u-shaped portions or wells 906, each well matching the position of a valley 904 in the middle planar section 901. Each well 906 is adapted to receive a proximal portion of an individual touch-proof connector. Jetting outward from each valley 904 is a keyhole or receiving section 910, smaller than the valley 904, and positioned between the middle planar section 901 and a medical device. Each keyhole/receiving section 910 is adapted to receive a distal end of the touch-proof connector.

Figure 9B:
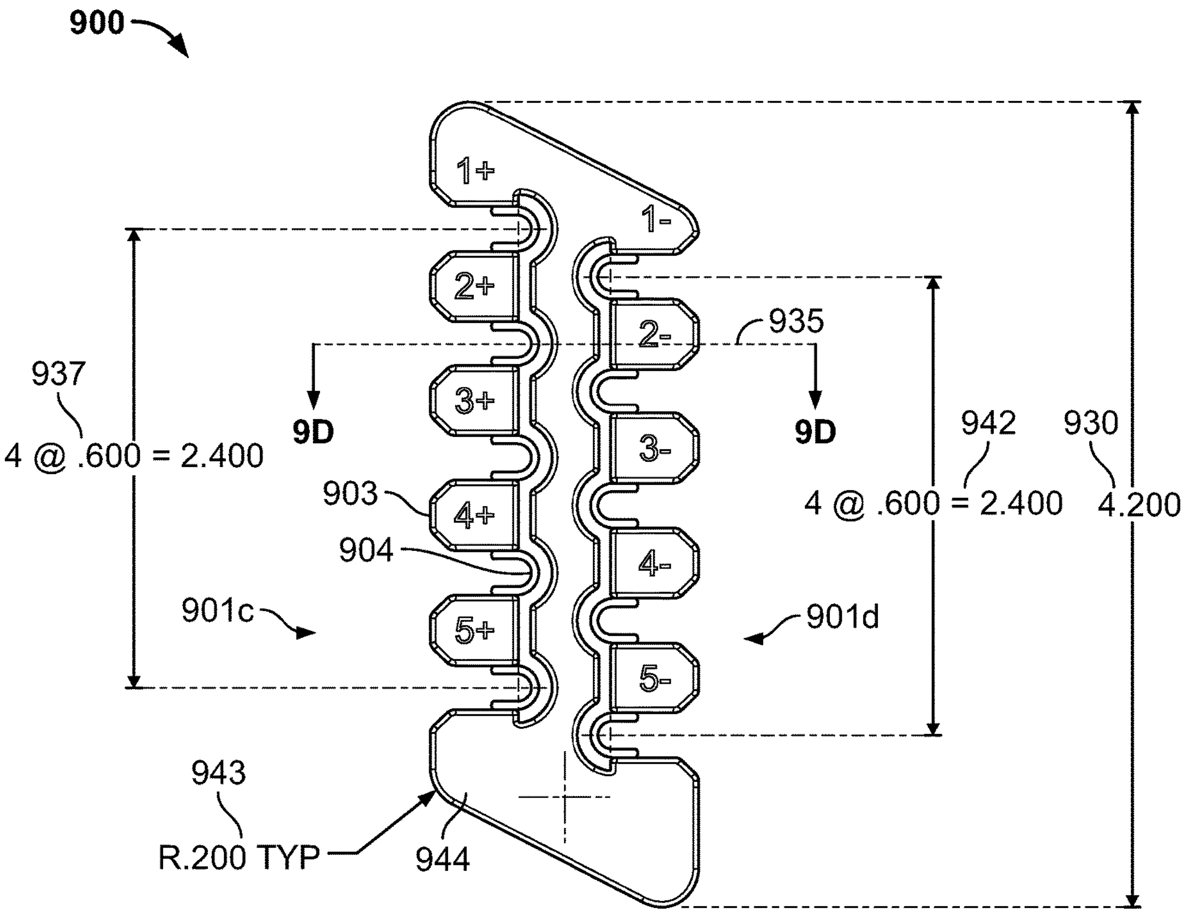
FIG. 9B is a front elevation view of the mass connection plate shown in FIG. 9A in accordance with an embodiment of the present specification.

FIG. 9B is a front elevation view of the mass connection plate shown in FIG. 9A in accordance with an embodiment of the present specification. As shown in FIG. 9B, MCP 900 comprises five channels or valleys 904 carved into each of the first side edge section 901*c* and second side edge section 901*d*. In above exemplary embodiment, the distance between the centers of two adjacent valleys 904 is equal to 0.6 inches and accordingly the distance 937 from the center of first valley to the center of fifth valley on first side edge section 901*c* is equal to 2.4 inches. The distance 942 from the center of first valley to the center of fifth valley on the second side edge section 901*d* is also equal to 2.40 inches in an embodiment. The full length 930 of middle planar section 901 is equal to 4.20 inches in the exemplary embodiment shown in FIG. 9B. The radius 943 of a filleted corner 944 of middle planar section 901 is equal to 0.020 inches in an embodiment.

Figure 9C:
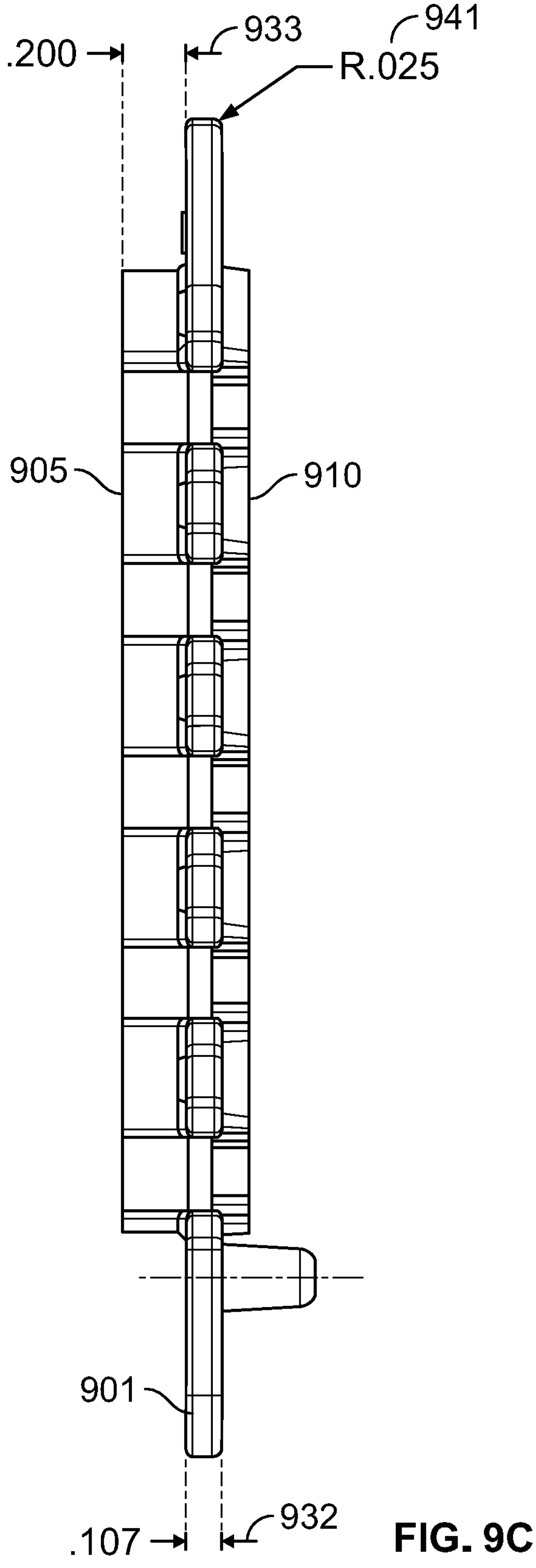
FIG. 9C is a side elevation view of the mass connection plate shown in FIG. 9A in accordance with an embodiment of the present specification.

FIG. 9C is a side elevation view of the mass connection plate shown in FIG. 9A in accordance with an embodiment of the present specification. As shown in FIG. 9C, the thickness 933 of proximal section 905 and the thickness 932 of middle planar section 901 are equal to 0.20 inches and 0.107 inches respectively in an exemplary embodiment. The radius 941 of a filleted edge of middle planar section 901 as depicted in FIG. 9C is equal to 0.025 inches in an embodiment.

Figure 9D:
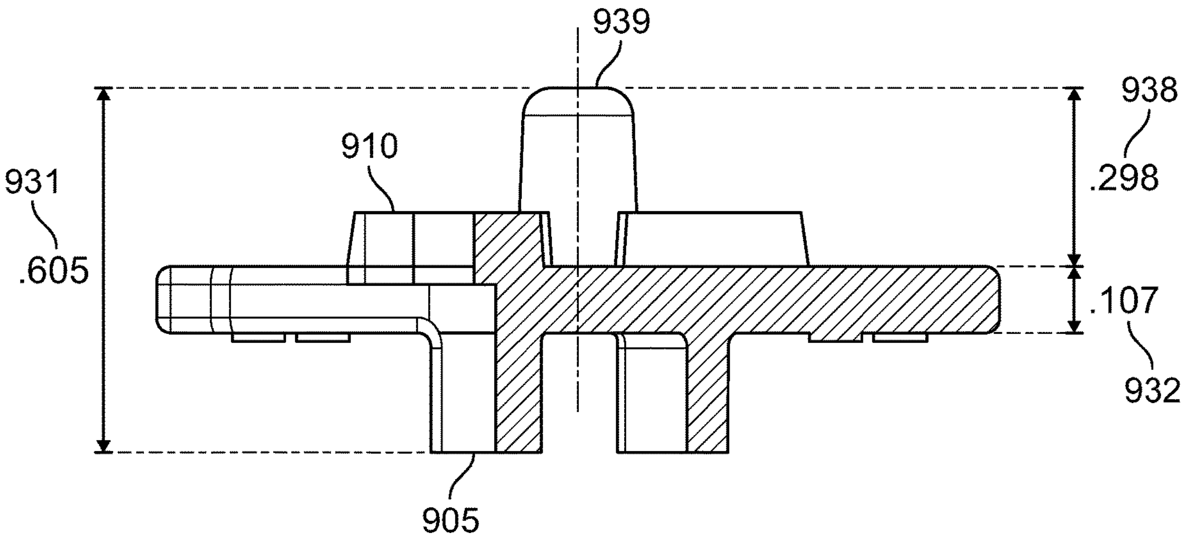
FIG. 9D is a sectional view of the mass connection plate shown in FIG. 9A in accordance with an embodiment of the present specification.

FIG. 9D is a sectional view of the mass connection plate shown in FIG. 9A in accordance with an embodiment of the present specification. As shown in FIG. 9D, the thickness 931 of MCP 900 is equal to 0.605 inches in an embodiment. FIG. 9D depicts a protruding portion 939 which is used as a keying element to ensure correct mating between MCP and medical device.

In embodiments, the protruding portion 939 present on MCP 900 is offset from the centerline of the MCP and is configured to enter into a corresponding mating void present on the medical device when the MCP is connected in a correct orientation. In embodiments, the MCP 900 can be engaged with the device in only one specific orientation. In other orientations, the MCP 900 cannot engage with the medical device as the mating void on the medical device would not be aligned to receive the protruding portion 939.

In some embodiments, because the MCP 900 has a symmetrical design, it would be possible to rotate the MCP 900 by 180 degrees and still plug it in the medical device leading to an incorrect connection. Therefore, in some embodiments, the presence of protruding portion 939 prevents incorrect mating between MCP and medical device. The mass connection plates that are not symmetrical in design do not require a protrusion or protruding portion 939 as these plates will not connect/mate with device in an incorrect orientation.

In an embodiment, the thickness 938 of the protruding portion 939 is equal to 0.298 inches.

Figure 9E:
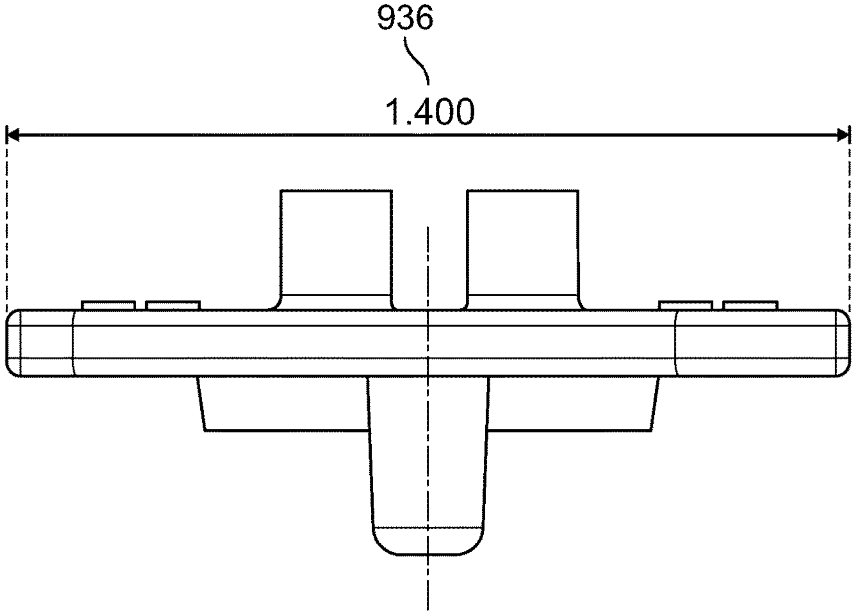
FIG. 9E is a bottom plan view of the mass connection plate shown in FIG. 9A in accordance with an embodiment of the present specification.

FIG. 9E is a bottom plan view of the mass connection plate shown in FIG. 9A in accordance with an embodiment of the present specification. As shown in FIG. 9E, the width 936 of MCP 900 is equal to 1.4 inches in an exemplary embodiment.

The foregoing is merely illustrative of the principles of the disclosure, and the systems, devices, and methods can be practiced by other than the described embodiments, which are presented for purposes of illustration and not of limitation. It is to be understood that the systems, devices, and methods disclosed herein may be applied to any types of medical procedures for monitoring or treatment of diseases.

Variations and modifications will occur to those of skill in the art after reviewing this disclosure. The disclosed features may be implemented, in any combination and sub-combination (including multiple dependent combinations and sub-combinations), with one or more other features described herein. The various features described or illustrated above, including any components thereof, may be combined or integrated in other systems. Moreover, certain features may be omitted or not implemented.

Examples of changes, substitutions, and alterations are ascertainable by one skilled in the art and could be made without departing from the scope of the information disclosed herein. All references cited herein are incorporated by reference in their entirety and made part of this application.

We claim:

1. A method for connecting a plurality of electrical connectors with connection ports of a medical device using a mass connection plate (MCP), the MCP comprising a middle planar section defined by a first plane, a plurality of wells, and a plurality of ledges, each of said plurality of ledges corresponding to one of the plurality of wells and coupled proximally to and extending perpendicularly from the first plane and away from said middle planar section in a first direction, the method comprising:

selecting the plurality of electrical connectors to be coupled with corresponding connection ports of the medical device;

selecting a MCP to couple the selected plurality of electrical connectors with the medical device;

positioning the selected plurality of electrical connectors into one of the plurality of wells and its corresponding one of the plurality of ledges of the selected MCP;

placing the selected MCP loaded with the selected plurality of electrical connectors near the connection ports of the medical device;

adjusting a positioning of the MCP loaded with the selected plurality of electrical connectors to align each selected plurality of electrical connector with a corresponding connection port of the medical device; and pushing the MCP towards the medical device to concurrently insert the selected plurality of electrical connectors engaged with the MCP into the corresponding connection ports of the medical device in order to establish an electrical connection between the selected plurality of electrical connectors and the medical device.

2. The method of claim 1, wherein selection of the MCP to couple the selected plurality of electrical connectors with the medical device is based on at least one of a type of the selected plurality of electrical connectors, a number of the selected plurality of electrical connectors, or the medical device.

3. The method of claim 2, wherein the type of the selected plurality of electrical connectors is based on one or more of a size or shape of said electrical connectors.

4. The method of claim 1, wherein selection of the MCP to couple the selected plurality of electrical connectors with the medical device is based on at least one of a number of the plurality of wells provided in the MCP or a number of the selected plurality of electrical connectors requiring connection to the medical device.

5. The method of claim 1, wherein positioning the selected plurality of electrical connectors into one or more of the plurality of ledges of the selected MCP comprises positioning a middle portion of each one of the selected plurality of electrical connector within each of the plurality of wells.

6. The method of claim 5, wherein positioning the selected electrical connectors into the selected MCP further comprises positioning a proximal portion of each one of the selected plurality of electrical connectors within each one of a second plurality of wells integrated into the selected MCP.

7. The method of claim 6, wherein positioning the selected plurality of electrical connectors into the selected MCP further comprises positioning a distal portion of each one of the selected plurality of electrical connectors within each one of a plurality of keyholes integrated into the selected MCP.

8. The method of claim 7, wherein positioning a distal portion of each one of the selected plurality of electrical connectors within each of one of the plurality of keyholes further comprises locking each one of said selected plurality of electrical connectors in a fixed position, wherein each one of the plurality of keyholes is configured to lock each one of said selected plurality of electrical connectors in said fixed position.

9. The method of claim 1, wherein positioning the selected plurality of electrical connectors into the selected MCP comprises receiving a proximal portion of each of the selected plurality of electrical connectors in a respective one of a second plurality of wells, wherein each of the first plurality of wells is aligned with one of said second plurality of wells.

10. The method of claim 1, wherein pushing the MCP towards the medical device to insert the selected plurality of electrical connectors engaged with the MCP into the corresponding connection ports of the medical device comprises using a protruding portion coupled to a distal end of the MCP for facilitating a correct connection of the selected MCP with the medical device.

11. The method of claim 1, wherein positioning the selected electrical connectors into said one of the plurality of wells and its corresponding one of the plurality of ledges of the selected MCP is facilitated by prevention of a horizontal movement of a respective one of the selected electrical connectors by the first plane of the middle planar section.

12. The method of claim 1, wherein positioning the selected electrical connectors into said one of the plurality of wells and its corresponding one of the plurality of ledges of the selected MCP is facilitated by prevention of a vertical movement of a respective one of the selected electrical connectors by each of the first plurality of wells in the middle planar section.

13. The method of claim 1, wherein positioning the selected electrical connectors into said one of the plurality of wells and its corresponding one of the plurality of ledges of the selected MCP is facilitated by prevention of a vertical movement of a respective one of the selected electrical connectors by each of the second plurality of wells.

14. The method of claim 1, wherein positioning the selected plurality of electrical connectors into the selected MCP comprises positioning a distal end of each of the selected plurality of electrical connectors into a respective receiving area in a distal section of the selected MCP.

15. The method of claim 1, wherein positioning the selected plurality of electrical connectors into the selected MCP comprises positioning a middle portion of each of the selected plurality of electrical connectors into a respective receiving area in the middle planar section of the selected MCP.

16. The method of claim 1, wherein positioning the selected plurality of electrical connectors into the selected MCP comprises positioning a proximal portion of each of the selected plurality of electrical connectors into a respective receiving area in a proximal section of the selected MCP.

17. The method of claim 1, wherein positioning the selected plurality of electrical connectors into the selected MCP comprises: positioning a middle portion of each one of the selected plurality of electrical connectors within each of the first plurality of wells, positioning a proximal portion of each one of the selected plurality of electrical connectors within each of a second plurality of wells integrated into the selected MCP: and, positioning a distal portion of each one of the selected plurality of electrical connectors within each of a plurality of keyholes integrated into the selected MCP, wherein each of the first plurality of wells has a first length, each of the second plurality of wells has a second length, and each of the keyholes has a third length and, wherein, in combination, the first, second, and third lengths are less than 0.800 inches.

18. The method of claim 1, wherein positioning the selected plurality of electrical connectors into the selected MCP comprises positioning a middle portion of each one of the selected plurality of electrical connectors within each of the first plurality of wells and wherein each one of the first plurality of wells is separated from an adjacent one of the first plurality of wells by a planar surface such that a curved surface of one of the first plurality of wells connects to a curved surface of a second of the first plurality of wells by a flat surface.

19. The method of claim 1, wherein positioning the selected plurality of electrical connectors into the selected MCP comprises positioning a distal end of each one of the selected plurality of electrical connectors into a respective receiving area in a distal section of the MCP and wherein the distal section is coupled proximate to a bottom edge of said middle planar section and extends distally in a direction that is substantially perpendicular to the middle planar section.

20. The method of claim 1, wherein the MCP is a unitary piece produced using an injection molding process.

* * * * *